(12) United States Patent
O'Herlihy et al.

(10) Patent No.: US 11,760,573 B2
(45) Date of Patent: Sep. 19, 2023

(54) BIDIRECTIONAL UNILINEAR MULTI-CARRIER REPOSITORY INTERFACE SYSTEM

(71) Applicant: Everseen Limited, Blackpool (IE)

(72) Inventors: Alan O'Herlihy, Glenville (IE); Joe Allen, Ballybunion (IE); Bogdan Ciubotaru, Donoughmore (IE); Raymond Hegarty, Dublin (IE)

(73) Assignee: Everseen Limited, Blackpool (IE)

( * ) Notice: Subject to any disclaimer, the term of this patent is extended or adjusted under 35 U.S.C. 154(b) by 478 days.

(21) Appl. No.: 17/166,006

(22) Filed: Feb. 3, 2021

(65) Prior Publication Data

US 2022/0242669 A1 Aug. 4, 2022

(51) Int. Cl.
*B65G 1/137* (2006.01)

(52) U.S. Cl.
CPC ................... *B65G 1/1375* (2013.01)

(58) Field of Classification Search
CPC .................................................. B65G 1/1375
See application file for complete search history.

(56) References Cited

U.S. PATENT DOCUMENTS

| | | | | |
|---|---|---|---|---|
| 6,715,981 B1* | 4/2004 | Harsch | ................... | B25J 9/1065 |
| | | | | 901/6 |
| 9,064,226 B2* | 6/2015 | Waller | ............... | G06Q 30/0255 |
| 2002/0192058 A1* | 12/2002 | Harsch | ................... | B21D 43/05 |
| | | | | 414/738 |
| 2007/0077135 A1* | 4/2007 | Harsch | ................. | B21D 43/105 |
| | | | | 414/222.01 |
| 2008/0029595 A1* | 2/2008 | Waller | ................. | G06Q 10/087 |
| | | | | 235/383 |
| 2009/0149985 A1* | 6/2009 | Chirnomas | ............. | G07F 11/26 |
| | | | | 705/26.1 |
| 2017/0301004 A1* | 10/2017 | Chirnomas | ............. | G07F 11/26 |
| 2017/0322561 A1* | 11/2017 | Stiernagle | ............... | G07F 11/62 |
| 2018/0053369 A1* | 2/2018 | High | ..................... | G07F 9/0235 |
| 2018/0096332 A1* | 4/2018 | O'Herlihy | ............ | G07G 1/0072 |
| 2018/0341908 A1* | 11/2018 | Lert, Jr. | .................. | G06Q 10/00 |
| 2022/0245582 A1* | 8/2022 | Moulin | .................... | E04H 14/00 |
| 2022/0281688 A1* | 9/2022 | Moulin | ................ | B65G 1/0457 |

* cited by examiner

*Primary Examiner* — Kyle O Logan
(74) *Attorney, Agent, or Firm* — Young Basile Hanlon & MacFarlane, P.C.

(57) ABSTRACT

A shuttle movable along a railing system extending along a repository. The shuttle comprises a panel member having a first face proximal to the railing system, and a second face distal therefrom, and a hinged arm member rotatable about a center of the second face of the panel member, and having first and second ends, wherein the hinged arm member is configured to move the second end between an unfolded position in which the second end is distal from the panel member, and a folded position, in which the second end is proximal to the second face of the panel member, and wherein the hinged arm member has a height and reach automatically adjustable to reach a user.

22 Claims, 18 Drawing Sheets

BIDIRECTIONAL UNILINEAR MULTI-CARRIER REPOSITORY INTERFACE SYSTEM

TECHNICAL FIELD

The present disclosure relates to a bi-directional unilinear multi-carrier repository interface system, and more specifically to an automated contactless interface system for accessing a repository to deposit goods into the repository or withdraw from the repository.

BACKGROUND

Storage facilities come in all shapes and forms and storage durations. For example, a warehouse can store items for long periods whereas a kitchen line in a restaurant could hold a plate of food for a very short period until it is taken to the dining area. However, regardless of their storage times, mechanisms of accessing the storage facilities to deposit or withdraw elements therefrom must be speedy. For example, speed of access to a storage facility is a key feature of just in time supply chain management. Similarly, slow service is a significant customer deterrent in customer-facing facilities.

The throughput of any sequential linear system for accessing a repository is inherently limited by the speed of the slowest access operation. One way of addressing this problem is to provide multiple parallel access channels to the repository, spreading access request traffic across the multiple access channels so that a particularly slow access request in one channel does not impact the throughput of the other channels. However, multiple parallel access channel systems have a significantly larger footprint than sequential linear systems. Where space is plentiful, the larger footprint of multiple parallel access channel systems is not problematic and such systems are a useful way of increasing throughput of access requests to the repository. However, in environments where space is less available and/or real estate is costly, alternative approaches must be adopted to increase access request throughput.

In the wake of Covid-19, social distancing has become an essential component in the armoury to stop the spread of the disease. In customer-facing services, the isolation of customers from other customers and staff members is especially important. For example, while drive-through restaurant lanes have been used for decades as a driver of sales at fast food chains, demand for such facilities has recently increased as pandemic restriction measures have forced the closure of indoor dining restaurants. The drive through restaurant arrangement uses customer vehicles and their ordered progression along a road to effectively isolate customers from each other. However, while paying for ordered food items and retrieving them from a kiosk, customers must come close to and interact with staff members of the restaurant. In other words, the conventional drive through restaurant arrangement offers incomplete social isolation insofar as it offers little isolation of customers from staff members. Notwithstanding its challenges, the advantages of the drive-through model has seen its adoption by many other sectors over the years including drive-through parcel centers, drive-through grocery stores etc.

SUMMARY

In an aspect of the present disclosure, there is provided a shuttle movable along a railing system extending along a repository. The shuttle comprises a panel member having a first face proximal to the railing system, and a second face distal therefrom, and a hinged arm member rotatable about a center of the second face of the panel member, and having first and second ends, wherein the hinged arm member is configured to move the second end between an unfolded position in which the second end is distal from the panel member, and a folded position, in which the second end is proximal to the second face of the panel member, and wherein the hinged arm member has a height and reach automatically adjustable to reach a user.

In another aspect of the present disclosure, there is provided an interface system for a repository, that includes a railing system extending alongside the repository, and a shuttle system comprising a plurality of shuttles, each shuttle movable along the railing system. Each shuttle includes a panel member having a first face proximal to the railing system, and a second face distal therefrom, and a hinged arm member rotatable about a center of the second face of the panel member, and having first and second ends, wherein the hinged arm member is configured to move the second end between an unfolded position in which the second end is distal from the panel member, and a folded position, in which the second end is proximal to the second face of the panel member, and wherein the hinged arm member has a height and reach automatically adjustable to reach a user.

In yet another embodiment of the present disclosure, there is provided a method of serving a user from a repository, by a shuttle including a panel member having a first face proximal to a railing system, and a hinged arm member rotatable about a center of a second face of the panel member and attached thereto. The method may include automatically sliding the panel member along the railing system to a first position, enabling the hinged arm member to automatically reach the user to receive an order from the user at the first position, automatically sliding the panel member along the railing system to a second position, enabling the hinged arm member to receive a goods item pertaining to the order from the repository, and enabling the hinged arm member to automatically reach the user to provide the goods item to the user.

Various embodiments of the present disclosure provide a bidirectional unilinear multi-carrier repository interface system, which for brevity will be referred to henceforth as the "Interface System". The Interface System enables several contemporaneous, and substantially independent interactions with a repository, said interactions comprising depositing goods into the repository and withdrawing goods from the repository.

The interface system includes a movable shuttle that follows the progress of a vehicle as it moves through a drive through facility, wherein the shuttle is provided with a movable arm whose height and reach can be automatically adjusted to reach the driver/passenger window of the vehicle to receive instructions and/or receive goods items from the vehicle. Examples of instructions include, but are not limited to, a food order, or a request to deposit a parcel in a parcel center, or a request to retrieve a parcel from a parcel center. The shuttle is movable to a loading area to receive the fulfilled food order or requested parcel and deliver it to the customer. Alternatively or additionally, the shuttle is movable to a goods receiving area to deposit a received parcel into a parcel storage area.

In a further embodiment, the shuttle is movable along an arcuate path to accommodate curved building structures. Similarly, the movable shuttle is supported on a railing system on which a plurality of billboards and/or electronic display devices are mounted, wherein the billboards and/or electronic display devices are adapted to display advertisements, promotions or other messages to customers as they progress along the queue in the drive through facility.

In a further embodiment, the interface system comprises several movable shuttle systems, thereby allowing several customers to be served simultaneously. Individual customers whose orders are more quickly fulfilled have their orders delivered to them more quickly than other customers whose orders take more time to fulfil. Thus, customers need not be served strictly according to their queuing order, but rather according to the time required to prepare their order. In other words, customers whose orders can be fulfilled quickly need not wait until customers ahead of them in the queue, whose orders may be more complex, are served. Customers who receive their orders sooner than other customers in the queue are directed to drive their vehicle away from the queue, thereby freeing up space for new vehicles to join the queue. Similarly, customers who make their deposits sooner than other customers in the queue are directed to drive their vehicle away from the queue, thereby freeing up space for new vehicles.

The overall effect is to increase the throughput of the drive through facility without negatively impacting the service enjoyed by customers with more complex requirements.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
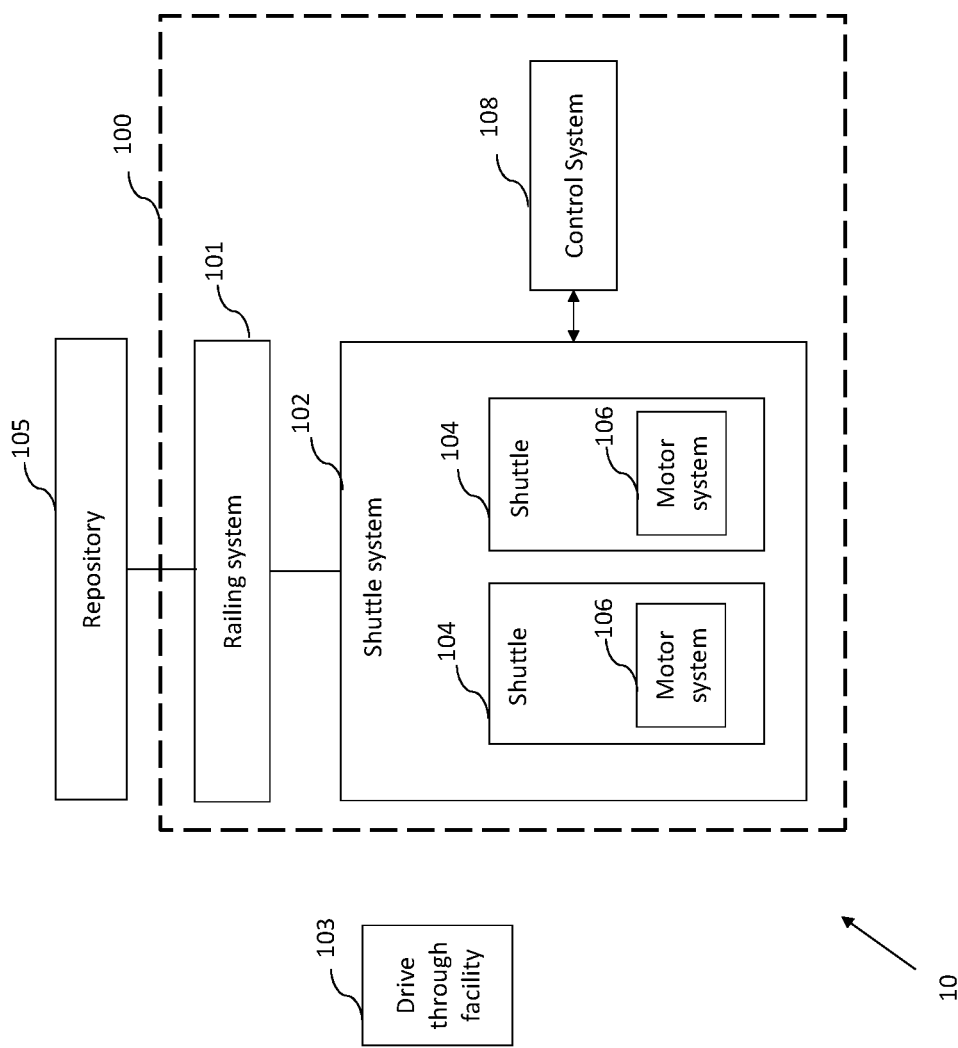
FIG. 1 illustrates an environment, wherein various embodiments of the present invention can be practiced.

FIG. 1 illustrates an environment 10, wherein various embodiments of the present invention can be practiced. The environment 10 includes an interface system 100 for a drive through facility 103, in accordance with an embodiment of the present disclosure. The interface system 100 includes a railing system 101 extending alongside a repository 105, a shuttle system 102 comprising at least one shuttle 104 in sliding engagement with the railing system 101, and at least one motor system 106 to drive corresponding shuttle 104. The interface system 100 further includes a control system 108, operably coupled to the shuttle system 102. The control system 108 automatically moves a shuttle 104 along the railing system 101 to a first position, upon entry of a vehicle in the drive through facility 103, operably enable the shuttle 104 to receive an order from a user of the vehicle at the first position, automatically move the shuttle 104 along the railing system 101 to a second position, and operably enable the shuttle 104 to fulfill the order from the repository 105 at the second position. The order includes at least one of: a food order, a request to deposit a parcel in a parcel center, a request to retrieve a parcel from the parcel center.

In one embodiment, the drive through facility 103 includes a drive through restaurant (or other retail) facility, and the interface system 100 relates to an automated contactless system for order taking and fulfilment in a drive through restaurant (or other retail) facility. Herein, the repository 105 includes a store of food (or goods) items and the interface system 100 supports the taking of food (or goods items) orders from customers in a drive-through restaurant (or other retail facility) setting and withdrawal of the ordered food (or goods) items from the repository to be delivered to the corresponding customers. In another embodiment, the drive through facility includes a drive through parcel center, and the interface system 100 includes an automated contactless system for receiving parcels into a drive-through parcel center and withdrawing of parcels from the parcel center, by the addressee of the parcel. Herein, the repository 105 includes a store of parcels; and the interface system 100 enables several users to separately and contemporaneously deposit additional parcels into a drive-through parcel center, and at the same time, enables several other users to separately and contemporaneously retrieve parcels from the parcel center.

It may be noted that the control system 108 may include one or more processors operable to respond to and process instructions that drive the autonomous shuttle system 102. The processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements that may be shared by other processing devices.

Figure 2:
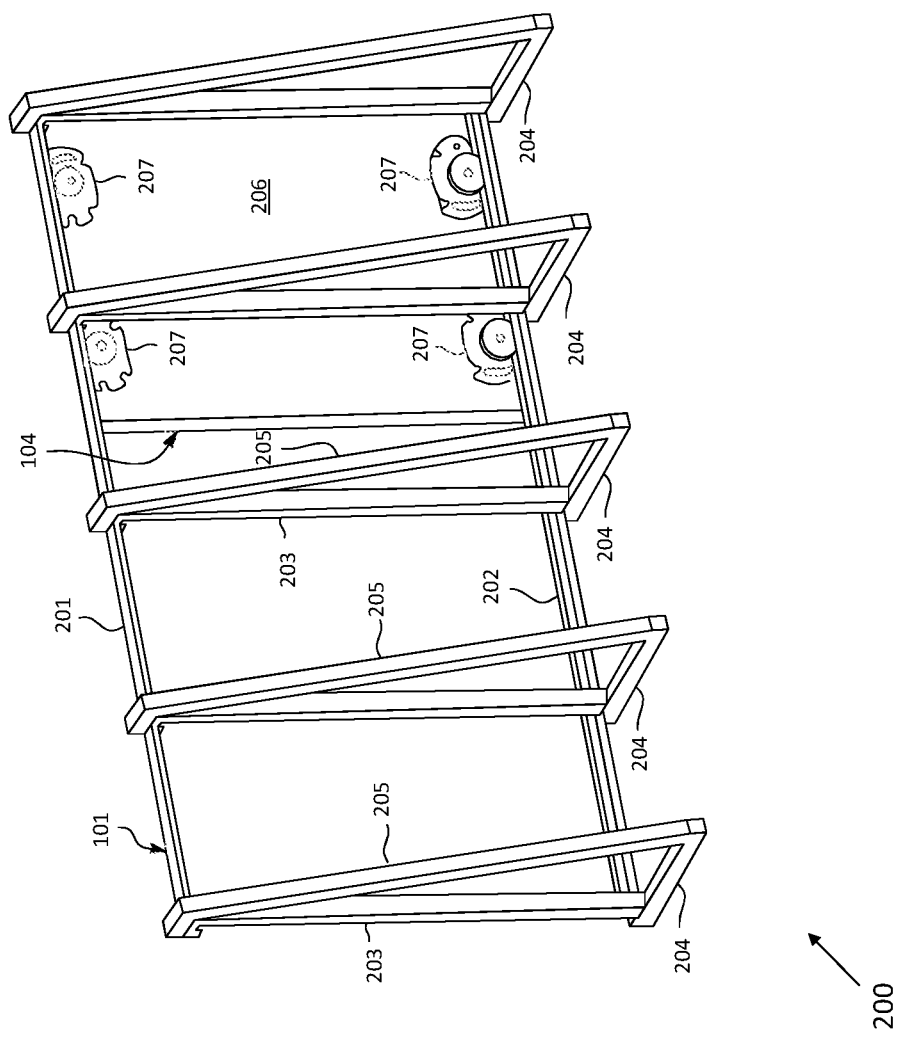
FIG. 2 illustrates a back facing side elevation of a railing system having a shuttle mounted thereon, in accordance with a first embodiment of the present disclosure.

FIG. 2 illustrates a back facing side elevation 200 of the railing system 101 having the shuttle 104 mounted thereon in accordance with a first embodiment of the present disclosure.

The railing system 101 includes an elongated flanged upper railing 201 and an elongated flanged lower railing 202, both of substantially the same dimensions, wherein the said lower railing 202 is coterminus with the upper railing 201. The upper railing 201 and the lower railing 202 are aligned substantially in parallel, and are held in a co-planar and spaced apart arrangement by several clamping members 203. The flanges of the upper railing 201 and the lower railing 202 are arranged with a substantially co-planar opposing disposition, so that the flanges partly cup the space between the upper railing 201 and the lower railing 202.

The railing system 101 further includes a plurality of support structures for connecting the upper and lower rail members, such that each support structure from the plurality of support structures is spaced apart from a successive one of the support structures in an equidistant manner along the length of the upper and lower rail members. A clamping member 203 and corresponding foot member 204 and strut member 205 collectively form a substantially right-angled triangular shaped support structure for the upper railing 201 and the lower railing 202, wherein said support structure is arranged to extend away from a first face of the upper railing 201 and a corresponding first face of the lower railing 202.

The clamping members 203 are arranged to engage with the faces of the upper railing 201 and the lower railing 202 that oppose their flanges. In this way, each clamping member 203 spans the distance between the upper railing 201 and the lower railing 202. Furthermore, at each point where the clamping member 203 engages with the upper railing 201 or the lower railing 202, a channel is effectively formed between the clamping member 203 and the closest flange by the relevant railing.

The clamping members 203 are arranged substantially equidistantly apart along the longitudinal axis of the upper railing 201 and the lower railing 202. The base of each clamping member 203 is coupled with a first end of a corresponding foot member 204. Each foot member 204 is arranged to extend away from the lower railing 202 at a substantially perpendicular angle thereto. The end of the foot member 204 furthest from the clamping member 203 is coupled with corresponding elongated strut member 205 which is arranged to extend from the end of corresponding foot member 204 to the upper railing 201.

The shuttle 104 includes a panel member 206, a first face of which is coupled with several wheeled members 207. The wheeled members 207 are aligned in parallel with the panel member 206. In use, the panel member 206 is disposed proximal to the faces of the upper railing 201 and the lower railing 202 opposing the support structure. More specifically, the panel member 206 is arranged so that the wheeled members 207 are substantially housed in the channel between the clamping members 203 and the railing flanges, to permit the wheels 207 to move in the channel and thereby enable the panel member 206 to be transported along the length of the upper railing 201 and the lower railing 202. Alternatively, the wheeled members 207 may comprise a groove adapted to match the thickness of the flanges, wherein the wheeled members 207 are arranged so that their grooves are fitted over the flanges, to thereby allow the wheeled members 207 to move along the flanges so that the panel member 206 is transported along the length of the upper railing 201 and the lower railing 202. The movement of the wheeled members 207 is driven by a primary on-board motor (not shown) of the motor system 106.

Figure 3:
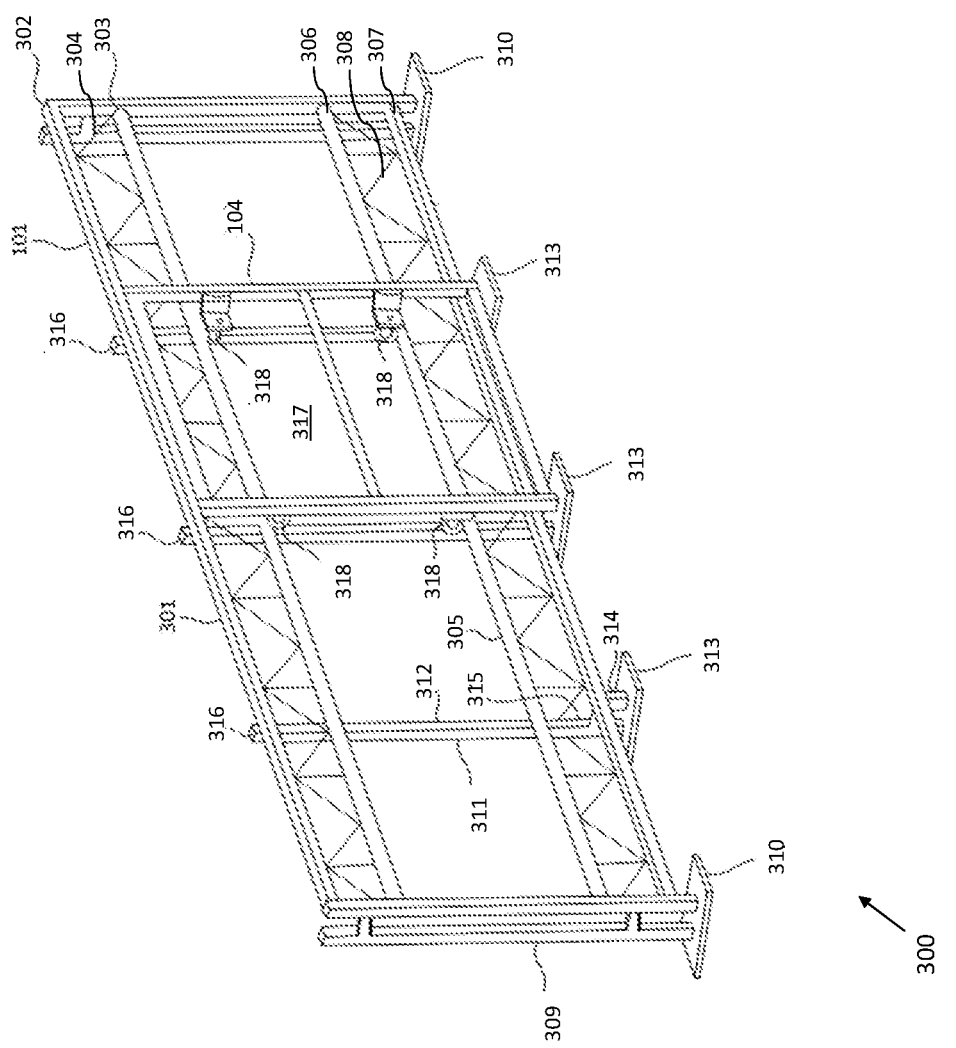
FIG. 3 illustrates a back facing side elevation of another railing system having a shuttle mounted thereon, in accordance with a second embodiment of the present disclosure.

FIG. 3 illustrates a back facing side elevation 300 of the railing system 101 with the shuttle 104 mounted thereon, in accordance with a second embodiment of the present disclosure.

The railing system 101 of the second embodiment has an improved structural strength and robustness compared with the railing system of the first embodiment. Specifically, the railing system 101 of the second embodiment comprises an upper railing 301 that is formed of a first upper railing 302 and a second upper railing 303 separated by a mesh 304. The railing system 101 of the second embodiment further includes a lower railing 305 that is formed of a first lower railing 306 and a second lower railing 307 separated by a mesh 308. The opposing ends of the upper railing 301 and the lower railing 305 are coupled to and supported by dual upright member structure 309 supported on a base plate 310.

The upper railing 301 and the lower railing 305 are aligned substantially in parallel, and are held in a spaced apart arrangement by several clamping members 311. The clamping members 311 are arranged substantially equidistantly apart along the longitudinal axis of the upper railing 301 and the lower railing 305. Each clamping member 311 comprises an upright member 312 and a base plate 313. A first end of the upright member 312 is provided with a bipedal base structure 314 wherein both feet of the bipedal base structure 314 are spaced apart by a horizontal spacing member 315, and the ends of the feet furthest from the horizontal spacing member 315 are mounted on the base plate 313. The clamping members 311 are arranged to engage with a first face of the railing system 101. In particular, the horizontal spacing member 315 is arranged to support the second lower railing 307. The second end of the upright member 312 is coupled with a horizontal grip member 316 which is arranged to engage with the first upper railing 302. In this way, each clamping member 311 spans the distance between the upper railing 301 and the lower railing 305.

The shuttle 104 of the second embodiment includes a panel member 317 disposed parallel to the railing system 101, a first face of which is coupled with several wheeled members 318. In use, the panel member 317 is disposed proximal to the faces of the upper railing 301 and the lower railing 305 opposing the clamping members 311. The wheeled members 318 are aligned in parallel with the panel member 317 and further aligned, in use, so that a first one or more wheeled members 318 are aligned with the second upper railing 303, and a second one or more wheeled members 318 are aligned with the first lower railing 306. The wheeled members 318 may comprise a groove adapted to match the thickness of the second upper railing 303 and the first lower railing 306. In use, the grooves of the first wheeled member(s) 318 are fitted over the second upper railing 303, and the grooves of the second wheeled member(s) 318 are fitted over the first lower railing 306, to thereby allow the wheeled members 318 to move along the second upper railing 303 and the first lower railing 306, so that the panel member 317 is transported along the length of the upper railing 301 and the lower railing 305. The movement of the wheeled member 318 may be driven by the primary on-board motor (not shown) of the motor system 106.

Although, two embodiments of the railing system 101 have been described herein, it would be apparent to one of ordinary skill in the art, that the railing system 101 may include other configurations such as a mono rail configuration.

Referring back to FIG. 2, the railing system 101 may include an upper railing 201 of the first embodiment without the lower railing 202 thereof. In this case, a second face (opposed to the first face) of the panel member 206 is coupled at an upper end thereof, disposed proximally to the upper railing 201, with a first side of one or more U-shaped brackets (not shown) or other suitable panel clamping members (not shown). The U-shaped bracket(s) (not shown) are arranged to extend over the upper end of the panel member 206, the upper railing 201 and the tops of the strut members 205 (if present), so that the upper end of the panel member 206 and the upper railing 201 are at least partly cupped within a channel formed in the U-shaped bracket(s) between the first side and an opposing side thereof. In this way, the U-shaped bracket(s) are arranged to effectively hold the panel member 206 in position relative to the upper railing 201 while the panel member 206 moves along the upper railing 201.

In another example, the railing system 101 may include a lower railing 202 of the first embodiment without the upper railing 201 thereof. In this case, the railing system 101 may not comprise the clamping members 203 and/or the strut members 205. Instead, the lower railing 202 may be supported at a slight elevation from the ground by the foot members 204. Furthermore, a lower end of the second face of the panel member 206, the said lower end being disposed proximally to the lower railing 202, is coupled with a counter-weight arranged to lower the center of gravity of the panel member 206, and thereby stabilise the panel member 206 during its movements along the lower railing 202.

Referring back to FIG. 3, the railing system 101 may include an upper railing 301 of the second embodiment without the lower railing 305 thereof. In this case, a second face (opposed to the first face) of the panel member 317 is coupled at an upper end thereof, disposed proximally to the upper railing 301, with a first side of one or more U-shaped brackets (not shown) or other suitable panel clamping members (not shown). The U-shaped bracket(s) (not shown) are arranged to extend over the upper end of the panel member 317, the upper railing 301 and the tops of the dual upright structures 309 and the horizontal grip members 316 (if present), so that the upper end of the panel member 317 and the upper railing 301 are at least partly cupped within a channel formed in the U-shaped bracket(s) between the first side and an opposing side thereof. In this way, the U-shaped bracket(s) are arranged to effectively hold the panel member 317 in position relative to the upper railing 301, while the panel member 317 moves along the upper railing 301.

In another example, the railing system 101 may include the lower railing 305 of the second embodiment without the upper railing 301 thereof. In this case, the railing system 101 may not comprise the dual upright structures 309 and the clamping members 311. Instead, the lower railing 305 may be supported at a slight elevation from the ground by the bipedal base structures 314. Furthermore, a lower end of the second face of the panel member 317, said lower end being disposed proximally to the lower railing 305, is coupled with a counter-weight arranged to lower the center of gravity of the panel member 317, and thereby stabilise the panel member 317 during its movements along the lower railing 305.

Figure 4:
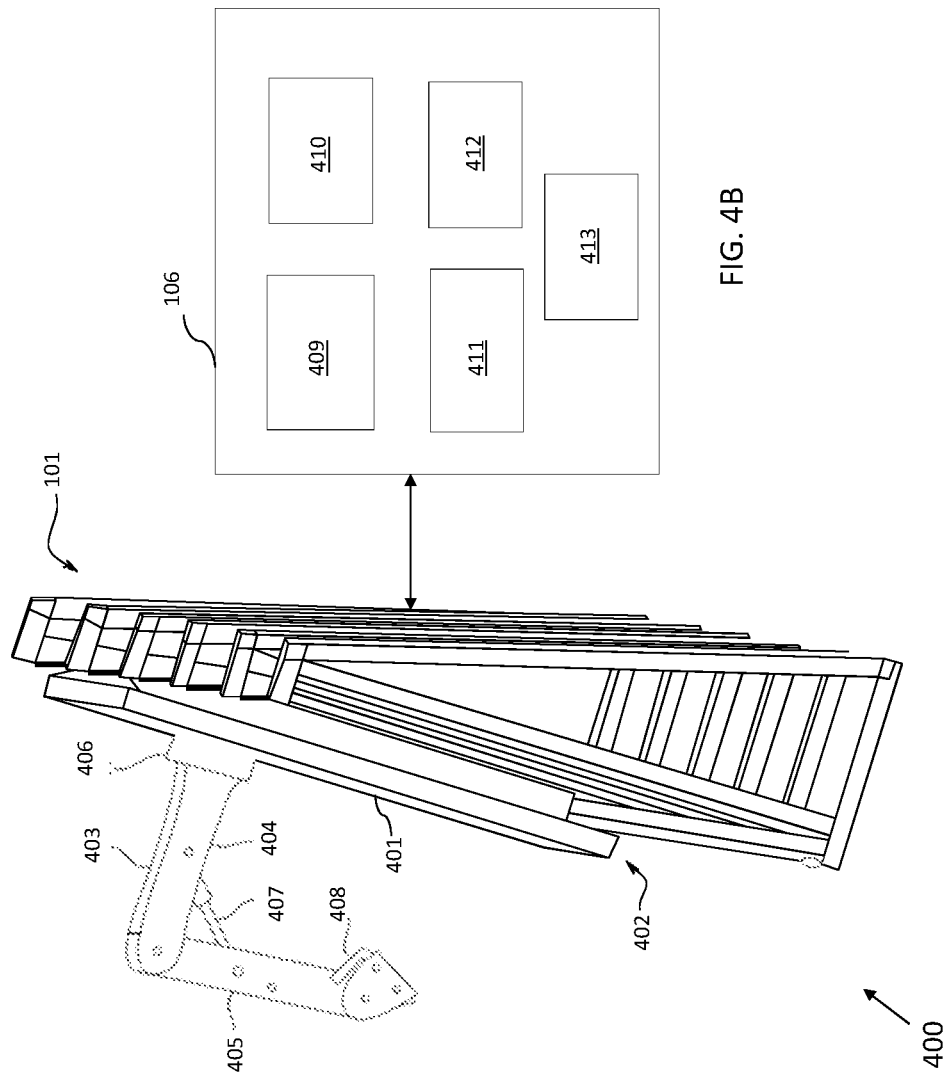
FIG. 4A illustrates a front facing side elevation view of a second face of a panel member, in accordance with an embodiment of the present disclosure.
FIG. 4B illustrates the motor system of the interface system of the environment of FIG. 1, in accordance with an embodiment of the present disclosure.

Referring to FIGS. 4A and 4B, a front facing side elevation view 400 of a second face 401 (opposite the first face) of a panel member 402 is illustrated, in accordance with a first embodiment of the present disclosure. The panel member 402 may be similar to each of the panel member 206 and 317 of FIGS. 2 and 3, respectively, and is driven by a primary on-board motor 409. The second face 401 is coupled with a hinged arm member 403. The hinged arm member 403 comprises a first arm member 404 having a first end supported by a rotatable base member 406, and a second end disposed away from the first end. The hinged arm member 403 further comprises a second arm member 405 having a first end pivotally coupled to the second end of the first arm member 401, and a second end disposed away from the first end of the second arm member 405. The first end of the first arm member 404 is mounted on the rotatable base member 406 which is mounted in a substantially central position on the second face 401, so that the first arm member 404 extends away from the panel member 402. The second end of the first arm member 404 is pivotally engaged with a first end of the second arm member 405.

The hinged arm member 403 further includes a strut member 407 coupled with the first and second arm members 404 and 405 to limit the movement of the second arm member 405 relative to the first arm member 404, so that the coupling therebetween essentially becomes a hinged coupling. More specifically, the second arm member 405 is movable by a secondary on-board motor 410 of the motor system 106 from an unfolded position in which the second arm member 405 extends from the first arm member 404 substantially at a right angle to the first arm member 404, to a folded position in which the second arm member 405 is disposed proximal to the first arm member 404 and substantially in parallel therewith.

The rotatable base member 406 is disposed on, and coupled to, a center of the second face of the panel member 402 for angularly rotating in a range of about 0-180 degrees about the center of the second face of the panel member 402. When the second arm member 405 is disposed in the unfolded position, rotation of the rotatable base member 406 by a tertiary motor 411 causes the second arm member 405 to be moved from a first rotated position orthogonally disposed to the direction of movement of the panel member (i.e. wherein the second arm member 405 is essentially disposed at a 6 o'clock position relative to the panel member) to a second rotated position co-axially aligned with the direction of movement of the panel member (i.e. wherein the second arm member 405 is essentially disposed at a 3 O'clock (or 9 O'clock) position relative to the panel member 401). The second arm member 405 is dimensioned to be more than half the width of the panel member in length, so that when the second arm member 405 is moved into the second rotated position, the second end of the second arm member 405 extends beyond the area of the panel member 402.

The second end of the second arm member 405 is pivotally coupled with a third arm member 408 which may possess a gripping member (not shown) to grip and hold a visual display unit (not shown), a contactless card reader or other RFID/NFC reader system (not shown). The visual display unit may include a touchscreen adapted to display a menu of goods items/services items to a user and detect selection of items from the menu by the user. The contactless card reader or other RFID/NFC reader system is adapted to interrogate a digital payment means such as payment card, smart card, smart phone, digital token, smart wearable device etc. and receive digital payment therefrom. The third arm member 408 may also include one or more speakers and one or more microphones to permit communication with a customer (not shown). The third arm member 408 may also comprise an antenna adapted to communicate with a mobile phone of the customer (not shown).

The second end of the second arm member 405 and the third arm member 408 is movable under the control of a quaternary on-board motor 412 from a first position proximal to the panel member 401 to a second position extending away from the panel member 401. The gripping member (not shown) is further operable under the control of a quinary on-board electrical motor 413 to permit opening and gripping to receive and hold a goods item and further opening to permit release of the goods item.

Thus, the hinged arm member 403 is rotatable about a center of the second face of the panel member 402, and having first and second ends, wherein the hinged arm member 403 is configured to move the second end between an unfolded position in which the second end is distal from the panel member 403, and a folded position, in which the second end is proximal to the second face of the panel member 403, and wherein the hinged arm member 403 has a height and reach automatically adjustable to reach a window of a vehicle in the drive through facility. The adjusting the height and reach of the hinged arm member 403 includes moving the second arm member 405 from the unfolded position in which the second arm member 405 extends from the first arm member 404 substantially at a right angle to the first arm member 404, to the folded position in which the second arm member 405 is disposed proximal to the first arm member 404 and substantially in parallel therewith.

It would be apparent to one of ordinary skilled in the art, that the primary, secondary, tertiary, quaternary and quinary on-board motors 409, 410, 411, 412 and 413 form the motor system 106 of FIG. 1, and may be integral, partially integral or individual. Furthermore, the skilled person will understand that any of the primary, secondary, tertiary, quaternary and quinary on-board motors 409, 410, 411, 412 and 413 may be replaced with a motor using a different actuation mechanism, for example, electric, pneumatic or hydraulic.

Figure 5:
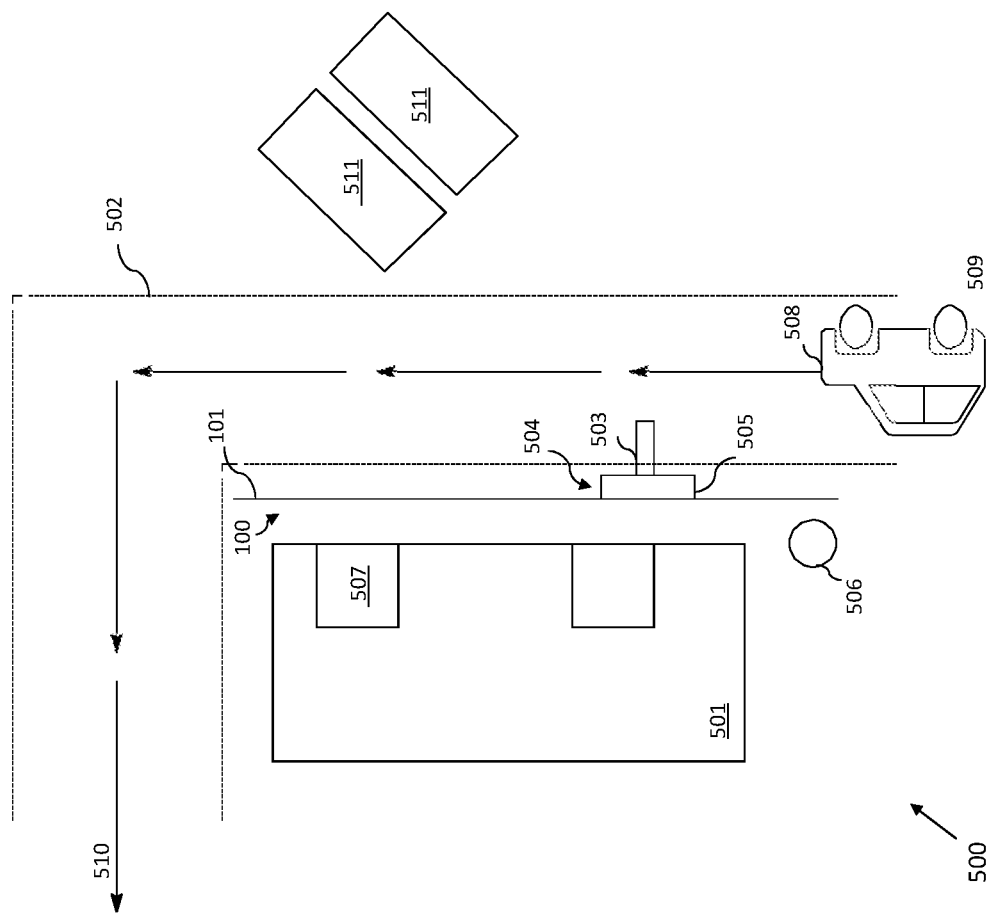
FIG. 5 illustrates a drive through facility implementing the interface system of the present disclosure.

FIG. 5 illustrates a drive through facility 500 that implements the interface system 100 of FIG. 1, in accordance with an embodiment of the present disclosure.

The drive through facility 500 includes a kiosk 501, a drive through region 502 having an entry 509 and an exit 510, and at least partially circumventing the kiosk 501. The interface system 100 includes the railing system 101 and a shuttle 504 including a hinged arm 503, and a panel member 505.

The interface system 100 is disposed between the kiosk 501, and the drive through region 502. In one embodiment, the drive through facility 500 includes a drive through restaurant, and the interface system 100 relates to an automated contactless system for order taking and fulfilment in the drive through restaurant. Herein, the kiosk 501 includes a store of food items and the interface system 100 supports the taking of food orders from customers in a drive-through restaurant setting and withdrawal of the ordered food items from the kiosk 501 to be delivered to the corresponding customers. In another embodiment, the drive through facility 500 includes a drive through parcel center, and the interface system 100 includes an automated contactless system for receiving parcels into a drive-through parcel center and withdrawing of parcels from the parcel center, by the addressee of the parcel. Herein, the kiosk 501 includes a store of parcels wherein the interface system 100 enables several users to separately and contemporaneously deposit additional parcels into the drive-through parcel center, and at the same time, enables several other users to separately and contemporaneously retrieve parcels from the parcel center.

The railing system 101 is mounted on the external walls of the kiosk 501 that faces the drive through region 502, and is arranged so that the hinged arm 503 of corresponding shuttle 504 faces out towards the drive through region 502. The shuttle 504 includes the panel member 505 and the hinged arm 503 connected thereto, and is movable along the railing system 101 from a first position proximal to a speaker 506 to a second position proximal to the a receiving window 507 of the kiosk 501. The motor system 106 and the control system 108 are not shown in FIG. 5 for the sake of clarity. However, the motor system 106 and the control system 108 are operably coupled to the kiosk 501, and the shuttle 504 for controlling the shuttle 504 and its interaction with a customer in a vehicle 508.

In an embodiment of the present disclosure, the motor system 106 is operably driven by the control system 108 to slide the panel member 505 along the railing system 101 to the first position, enable the hinged arm member 503 to automatically reach the window of the vehicle 508 at the first position to receive an order from a user in the vehicle 508, slide the panel member 505 along the railing system 101 to the second position, enable the gripping member to receive and hold a goods item pertaining to the received order, from the repository (kiosk) 501 at the second position, and enable the hinged arm member 503 to automatically reach the window of the vehicle 508 and enable the gripping member to release the object to the user. The second position is selected from at least one of: a location of the repository (kiosk 501), a current location of the vehicle 508, a predetermined location by the user, and a location determined by the control system 108 based on time required by the repository to ready the order.

Figure 6:
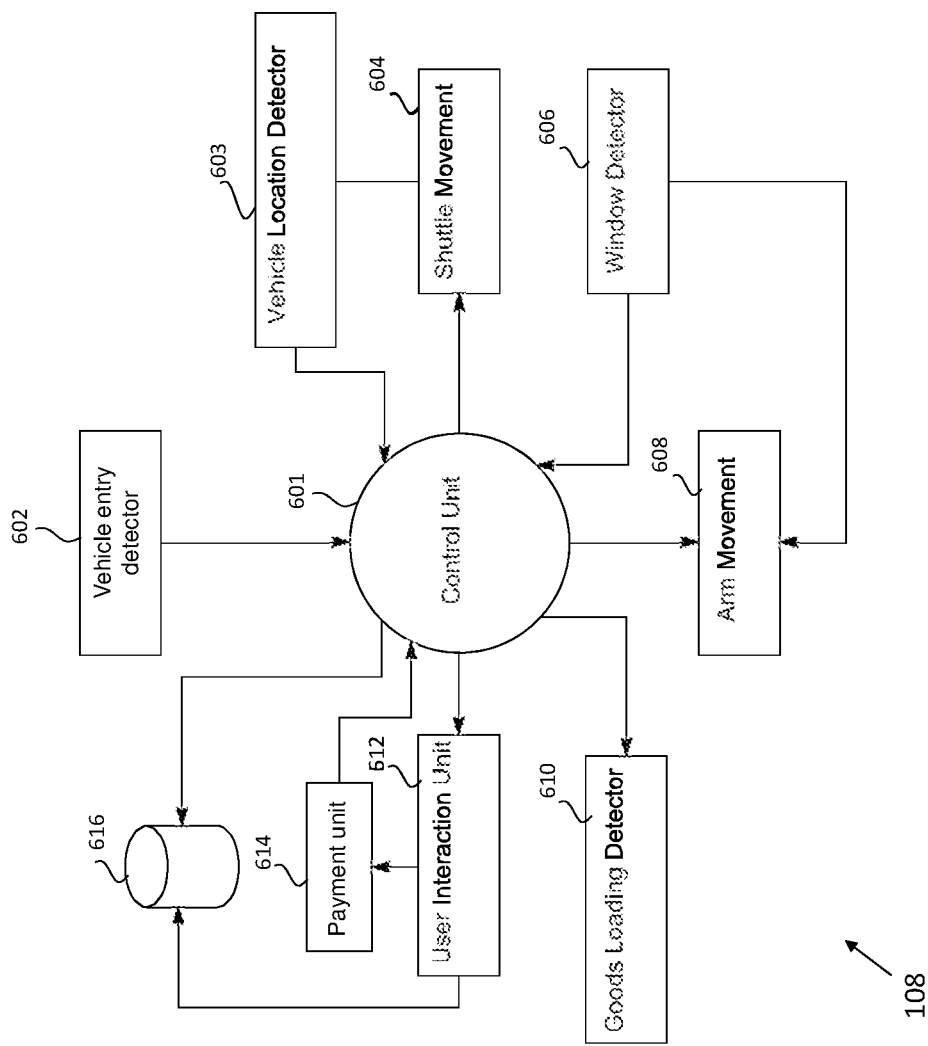
FIG. 6 is a block diagram of a control system of the interface system, in accordance with an embodiment of the present disclosure.

FIG. 6 illustrates a block diagram of the control system 108, in accordance with an embodiment of the present disclosure. FIG. 6 has been explained with reference to FIGS. 1, 4A, 4B, and 5.

The control system 108 includes a control unit 601 which is in communication with the motor system 106 to control the movements of the autonomous shuttle system 102 and its interactions with the customers.

The control system 108 further includes a vehicle entry detector 602, a vehicle location detector 603, a shuttle movement actuator 604, a window detector 606, an arm movement actuator 608, a goods loading detector 610, a user interaction unit 612, a payment unit 614, and a database 616.

The vehicle entry detector 602 is in communication with the control unit 601, to detect entry of a vehicle 508 into the drive through facility 500. In an embodiment of the present disclosure, the entry detector unit 602 includes one or more cameras (not shown) configured to capture a video/image of the drive through facility 500, and process a captured video footage/image to detect entry of one or more vehicles 508 from an entry point 509 to an exit point 510. Entry detection is a trigger for subsequent operations of the control system 108.

The vehicle location detector 603 is in communication with the control unit 601 to detect a location of the vehicle 508 within the drive through facility 500. In an embodiment of the present disclosure, the vehicle location detector 603 may employ one or more pattern recognition algorithms (e.g. convolutional network networks) to receive and process video and other data (e.g. LIDAR, ultrasonic etc.) to detect the location of the vehicle 508.

The shuttle movement actuator 604 is in communication with the control unit 601 and the vehicle location detector 603, to actuate the primary motor system 409 to cause movement of the at least one shuttle 504 along the railing system 101 in response to the vehicle location being detected by the vehicle location detector 603.

The window detector 606 is in communication with the control unit 601, to determine a position of a window of the vehicle 508 relative to the railing system 101. In an embodiment of the present disclosure, the window detector 606 may employ one or more pattern recognition algorithms (e.g. convolutional network networks) to receive and process video and other data (e.g. ultrasonic, infrared etc.) to detect and determine the location of a passenger or a driver window of the vehicle 508 relative to the railing system 101.

The arm movement actuator 608 is in communication with the control unit 601 and the window detector 606, to actuate at least one of: the secondary and tertiary motor systems 410 and 411 for causing movement of the rotatable base member 406 and the second arm member 405 of the hinged arm member 503.

The goods loading detector 610 is in communication with the control unit 601 to control the quinary on-board motor 413, and receive and process video and other data (e.g. ultrasonic, infrared etc) to detect the loading and unloading of goods onto and from the gripping member of the third arm member 408.

The user interaction unit 612 is in communication with the control unit 601 and a visual display unit held by a gripping member, to provide one or more user interfaces on the visual display unit, to facilitate interaction with the customer related to the order of the customer. In an embodiment of the present disclosure, the user interaction unit 612 is configured to provide responsive user interfaces customised to the requirements of the relevant use case of the Interface system. In the event, the visual display unit is a touchscreen, the user interaction unit 612 receives a signal from the touchscreen indicative of a selection made by a user. Alternatively, the user interaction unit 612 may employ automatic speech recognition algorithms such as Gaussian Mixture Model based Hidden Markov Models (GMM-HMM), K-Means Clustering, Expectation Maximisation (EM), Kernel Principal Component Analysis, Deep Belief Neural Networks (DBN), Recurrent Neural Network (RNN) or Time Delay Neural Network (TDNN) adapted to process user utterances received by a microphone and recognise from the utterances, selections made by a user. Similarly, the user interaction unit 612 may employ computer vision pattern recognition algorithms (e.g. deep convolutional networks) adapted to process images extracted from captured video footage (for example, images of identification documents provided by a customer) to recognise and extract relevant features therefrom. The user interaction unit 612 may employ mobile telecommunications protocols to support two-way communications with a user's mobile phone to receive therefrom a signal whose content indicates the user's selections.

The payment unit 614 is in communication with the control unit 601, the user interaction unit 612, and a contactless card reader to actuate the contactless card reader to receive payment from the customer pertaining to the order. The payment unit 614 is adapted to operate the contactless card reader or other RFID/NFC reader system (mounted on the hinged arm member 503) to receive payment from a customer and confirm receipt of payment to the Control Unit 601.

The database 616 is in communication with the user interaction unit 612 and the control unit 601 to store data pertaining to identity, historical and current transactions of one or more customers. In an embodiment of the present disclosure, the database 616 receives and stores at least some of the communications, for example, menu item selections made by a user received by the user interaction unit 612 from the user/user's mobile phone. The database 616 may also store price or charging information relevant to the given use case of the Interface System. A person of ordinary skill in the art would understand that storage in the database 616 may be session-based or of a predefined duration. For example, unless the customer has given their consent otherwise, in a session-based storage protocol, communications (for example, menu item selections made by a user) received by the user interaction unit 612 from the user/user's mobile phone may be deleted from the database 616 upon the departure of the customer from the drive through facility 500. Alternatively, with the consent of the customer, particular aspects of the communications may be retained in the database 516 for a longer duration, to enable recognition of the customer and expediting their orders in subsequent visits to the drive through facility 103. By contrast, non-personal data, for example, pricing lists, menu items etc may be retained for as long as required in the database 616.

The control system 108 may further include a registration detection module (not shown), in communication with the control unit 601, to detect and recognize the registration number of a vehicle from their number plate. In an embodiment of the present disclosure, the registration detection module may include one or more pattern recognition/object recognition algorithms (e.g. deep convolutional neural network) adapted to process video footage captured by a video camera mounted on the shuttle 504 to detect and recognise the registration number of the vehicle from the number plate thereof. The registration detection module is further adapted to store the detected registration number in the database 616.

In one embodiment, each of the components 601-616 could exist on a single physical processor, or on more than one processor, and may be implemented in a programming language to communicate through messaging protocols. If the components run on a single processor, they could run in separate processes which communicate by communication protocols. If they run within a single process, they might run as threads. If running in a single process, they could also use a reactive design, enabling the components to share one or more threads.

Also, the term "neural network" as used herein can include a highly interconnected network of processing elements, each optionally associated with a local memory. In an example, the neural network may be Kohonen map, multilayer perceptron or more recent deep learning architectures and so forth. Furthermore, the processing elements of the neural networks can be "artificial neural units", "artificial neurons," "neural units," "neurons," "nodes," and the like. Moreover, the neuron can receive data from an input or one or more other neurons, process the data, and send processed data to an output or yet one or more other neurons. The neural network or one or more neurons thereof can be generated in either hardware, software, or a combination of hardware and software, and the neural network can be subsequently trained.

In a further embodiment of the interface system 100, one or more billboards or electronic display devices are mounted between the upper railing and lower railing of the railing system 101, so that the customer is presented with advertisements, promotions or other information as they progress along the drive through region 502 from an entry point 509 to an exit point 510, and most especially while the vehicle 508 is progressing toward the kiosk's receiving window 507 and waiting for the customer's order to be delivered by the hinged arm member 503.

Figure 7:
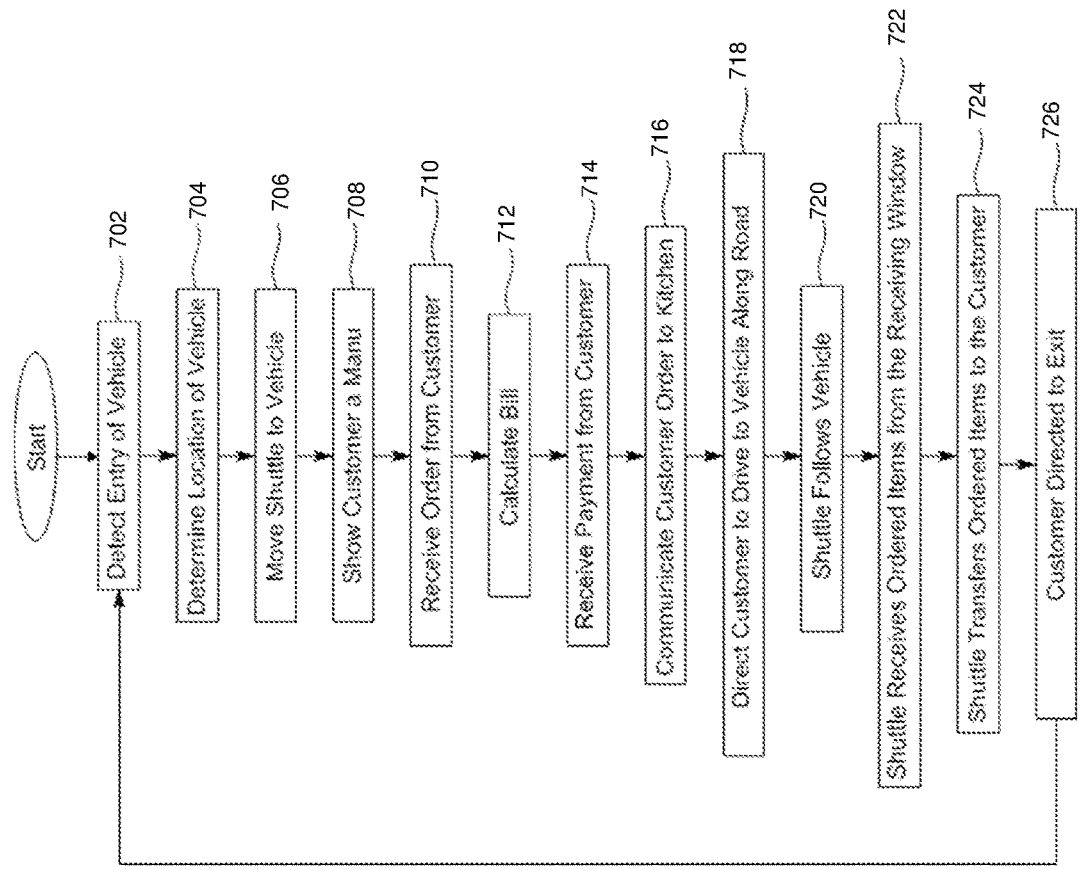
FIG. 7 is a flowchart illustrating an exemplary method implemented by the interface system for fulfilling food orders in a drive through facility of FIG. 5, in accordance with an embodiment of the present disclosure.

FIG. 7 is a flowchart illustrating a method implemented by the interface system 100 for fulfilling food orders in the drive through facility 500, in accordance with an embodiment of the present disclosure. The method has been explained with reference to FIGS. 1, 4B, 5 and 6. The drive through facility 500 is one of a drive through restaurant facility and a drive through parcel center.

At step 702, the entry detector 602 detects the entry of the vehicle 508 onto the road 502 of the drive through facility 500.

At step 704, the vehicle location detector 603 determines the location of the vehicle 508 relative to the kiosk 501.

At step 706, the shuttle movement actuator 604 moves the shuttle 504 along the railing system 101 towards the vehicle 508 using the location information determined by the vehicle location detector 603.

At step 708, the customer is shown a menu of food items by extending towards the customer the hinged arm member 503 on which a visual display unit displaying the menu is mounted. The video footage captured by the video camera system (not shown) disposed proximal to the railing system 101 is processed by the window detector 606 to detect the distance of the driver/passenger window of the vehicle 508 from the railing system 101 and the height of the driver/passenger window from the ground, to accommodate vehicles of different heights. Using this location information, the control unit 601 operates the arm movement actuator 608 to automatically cause the hinged arm member 503 to be extended to the driver/passenger window of the vehicle 508.

At step 710, an order from the customer is received regarding their selection of food items from the menu. At step 712, a total bill for the order is calculated and the total bill is presented to the customer. In an embodiment of the present disclosure, the user selection is recorded by the user interaction unit 612 and provided to the control unit 601, which in turn retrieves from the database 616, the prices of the selected food items, and calculates the total bill for the selection.

At step 714, payment from the customer is received by the contactless card reader or other RFID/NFC reader system. In an embodiment of the present disclosure, the control unit 601 operates the user interaction unit 612 to request payment from the customer for the ordered items. The customer is requested to present their contactless payment means to the contactless payment receiver mounted on the gripping member of the hinged arm member 503. The payment unit 614 operates the contactless payment receiver (not shown) to receive payment of the total bill and confirm receipt of same to the control unit 601.

At step 716, the control unit 601 communicates the customer's order to kitchen staff in the kiosk 501. At step 718, the customer is directed to drive the vehicle 508 to the kiosk's receiving window 507. In an embodiment of the present disclosure, upon confirmed receipt of payment, the control unit 601 communicates the customer's order details to the kiosk 501 for preparation by kitchen staff therein. The control unit 601 also operates the user interaction unit 612 to direct the customer to drive the vehicle 508 along the road 502 to the kiosk's receiving window 507. The control unit 601 further operates the arm movement actuator 608 to retract the hinged arm member 503 into the folded position.

At step 720, the shuttle movement actuator 604 moves the shuttle 504 along the railing system 101 to follow the vehicle 508. In an embodiment of the present disclosure, the control unit 601 activates the vehicle location detector 603 to update its determination of the location of the vehicle 508 and thereby track the movement of the vehicle 508 as it is driven along the road 502. Using the updated location information, the shuttle movement actuator 604 causes the shuttle 504 to be moved along the railing system 101 to follow the vehicle 508 as it progresses along the road 502 to the kiosk's receiving window 507.

At step 722, the shuttle 504 receives the customer's order from the kiosk's receiving window 507. In an embodiment of the present disclosure, upon arrival of the vehicle 508 at the kiosk's receiving window 507, the control unit 601 operates the arm movement actuator 604 to cause the second arm member of the hinged arm 503 to be moved into the unfolded position, and the rotatable base member 406 to be rotated so that the second arm member 405 is moved to the second rotated position. As a result, the second arm member is moved towards the kiosk's receiving window 507. Further, the control unit 601 operates the goods loading detector 610 to operate the quaternary (and potentially the quinary) on-board motor 412 (and 413) and thereby activate the gripping member of the hinged arm 503, to receive the customer's ordered food items, which are loaded onto the gripping member (not shown) by operators from behind the railing system 101.

At step 724, the shuttle 504 transfers the customer's order to the customer. In an embodiment of the present disclosure, upon confirmation by the goods loading detector 610 of the receipt by the gripping member (not shown) of the ordered food items, the control unit 601 operates the arm movement actuator 608 to cause the second arm member 405 to be moved to the first rotated position, and to move the second arm member 405 to a position between the folded and unfolded position as appropriate, to move the ordered food items to the driver/passenger window. In this way, food is transferred by the hinged arm member 503 from the kiosk's receiving window 507 to the customer.

At step 726, the control unit 601 generates one or more instructions for the user to drive the vehicle 508 to the exit 510. In an embodiment of the present disclosure, upon detection by the goods loading detector 610 of the retrieval by the customer of the food items from the gripping member of the hinged arm 503, the control unit 601 operates the user interaction unit 612 to direct the customer to drive the vehicle 508 to the exit point 510. The control unit 601 further operates the shuttle movement actuator 604 to cause the shuttle 504 to be moved along the railing system 101 towards a location of a next vehicle 511 detected entering onto the road 502 from a parking facility.

Figure 8:
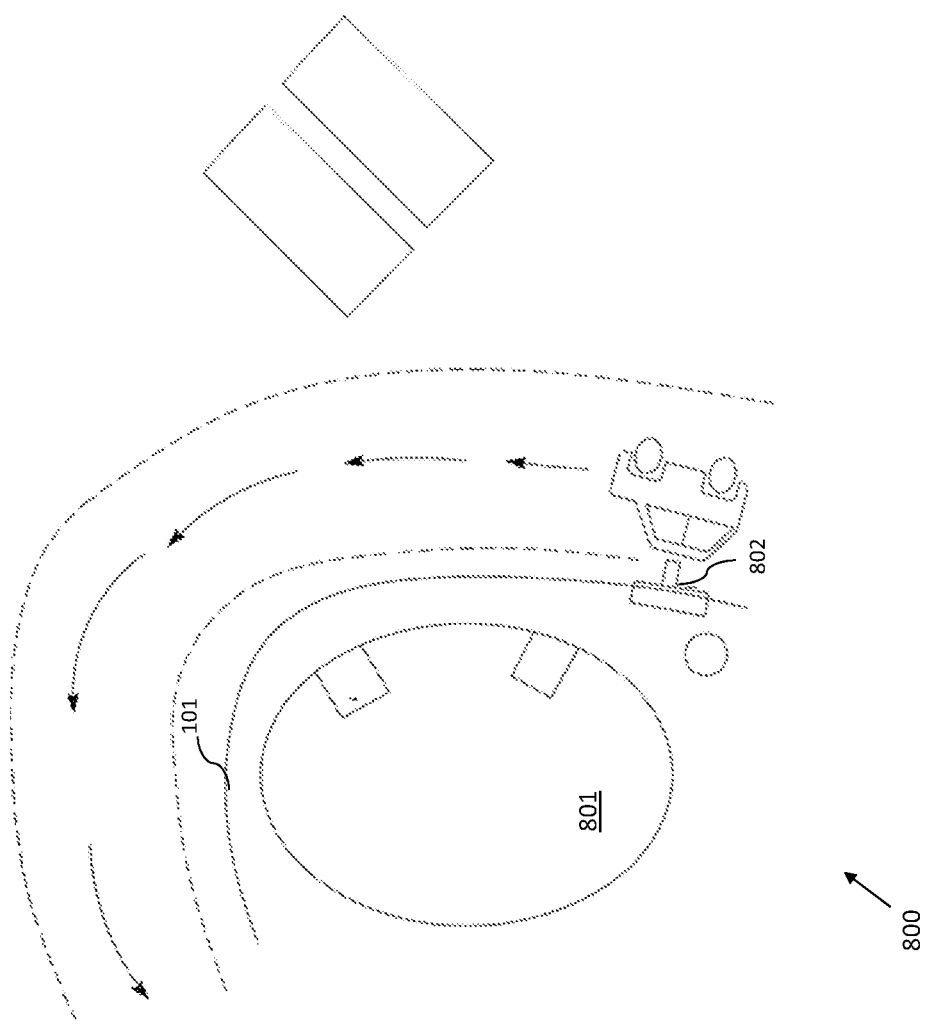
FIG. 8 is a block diagram of a drive through facility that includes an interface system in accordance with the present disclosure in an arcuate arrangement.

FIG. 8 is a block diagram of a drive through facility 800 that includes a interface system 100 in an arcuate arrangement, in accordance with an embodiment of the present disclosure. The drive through facility 800 is one of a drive through restaurant facility and a drive through parcel center.

Referring to FIG. 8 together with FIGS. 1, 4A, and 5, the railing system 101 is not limited to a straight-line conformation. On the contrary, the railing system 101 is configurable in an arcuate arrangement (a curvilinear manner) to follow a curved external wall of a kiosk 801. In this case, the width of billboard or an electronic display devices mounted between the upper railing and lower railing of the railing system 101, and corresponding panel member must balance the requirements of being sufficiently large to accommodate ordered goods items, i.e. to permit their loading onto the hinged arm member 802 (not shown) while being small enough to accommodate the radius of curvature of the external wall of the kiosk 801.

Figure 9:
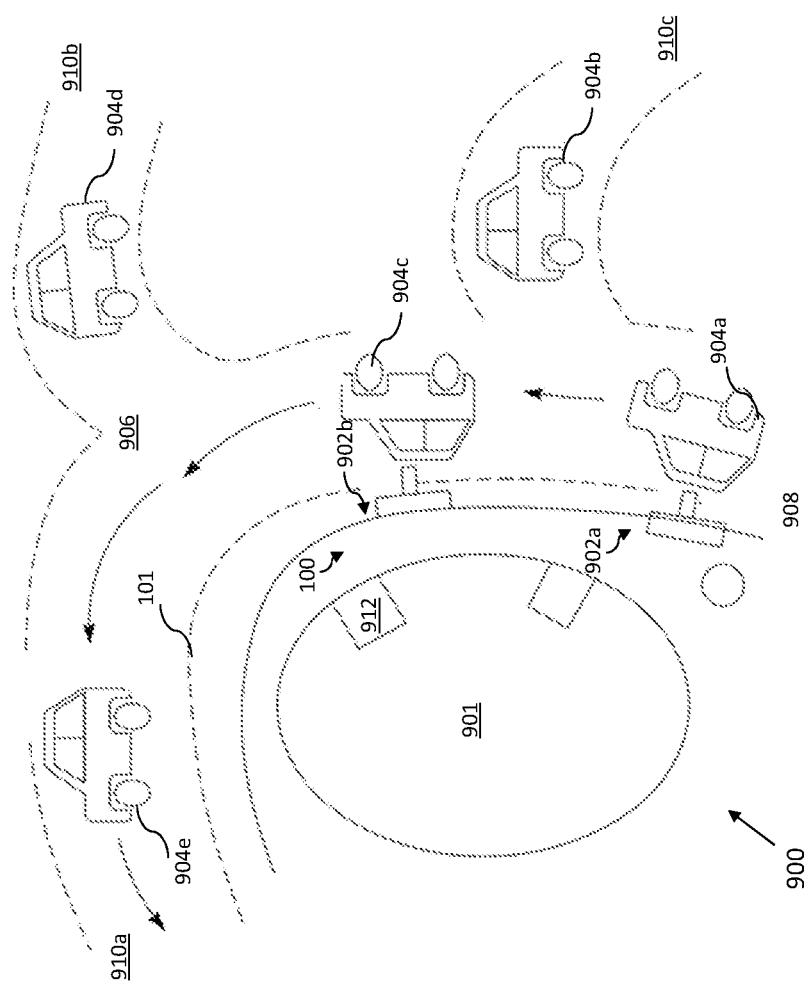
FIG. 9 is a block diagram of an alternative arrangement of a drive through facility that includes an interface system for serving several customers at the same time.

FIG. 9 is a block diagram of a drive through facility 900 that includes an interface system 100 for serving several customers at the same time, in accordance with a second embodiment of the present disclosure. The drive through facility 900 includes a drive through region 906 having an entry 908 and a main exit 910a, and first and second side exits 910b, and 910c. The interface system 100 is disposed between the kiosk 901 and the drive through region 906 for serving customers through various exits. The drive through facility 900 is one of a drive through restaurant facility and a drive through parcel center.

The drive through region 906 includes main, first and second side lanes corresponding to main, and first and second side exits 910a, 910b and 910c, for facilitating simultaneous movement of multiple vehicles, alongside the kiosk 901.

The interface system 100 includes first and second movable shuttles 902a-902b mounted on the railing system 101 that may have a straight line or arcuate configuration. Each of the first and second movable shuttles 902a-902b is adapted to serve one of first through fifth vehicles 904a-904e.

In an embodiment of the present disclosure, the control system 601 dynamically computes a time required by each shuttle to fulfill each order, and dynamically configures a sequence of the plurality of shuttles 902a-902b for fulfilling the plurality of orders.

In another embodiment of the present disclosure, two shuttles can be used to serve a single vehicle. More specifically, the control system 601 automatically moves the first shuttle 902a along the railing system 101 to the first position, upon entry of a vehicle 904a in the drive through region, receives an order from a user of the vehicle 904a at the first position, instruct the vehicle 904a to reach a second position, automatically move the second shuttle 902b along the railing system 101 to the second position, and enable the second shuttle 902b to fulfill the order from the repository (kiosk 901) at the second position.

In an embodiment of the present disclosure, one or more billboards or electronic display devices may be slidably mounted between the upper railing and lower railing of the railing system 101, so that the customer is presented with advertisements, promotions or other information as they progress along a drive through region 906 of the drive through facility 900, from an entry point 908 of the drive through region 906 to an exit point 910 thereof. Also, at least one aperture may be provided between adjacent billboards or electronic display devices along the length of the railing system 101 to permit access by operators to the hinged arm member of the first and second shuttles 902a and 902b, so that for example, a customer's order may be loaded onto the first shuttle 902a before the first vehicle 904a reaches the kiosk's receiving window 912. In an embodiment of the present disclosure, the aperture is dynamically configured to expedite fulfillment of an order in the event of the plurality of orders. Also, the control system 108 is configured to operate the shuttles 902a and 902b to direct the vehicle of the customer towards a nearest one of: a main exit and the at least one other exit implemented by way of a just-in-time (JIT) technique.

In the present embodiment, the shuttles 902a and 902b are configured to operatively fulfill a plurality of orders corresponding to the plurality of customers in at least one of a first-in first-out (FIFO) basis, and a sequence corresponding to a time taken by the interface system 100 to fulfill each order from the plurality of orders, and wherein the control system 108 is configured to dynamically configure the sequence, in real-time and, in a least-to-greatest amount of time required by the shuttle 902a, 902b to fulfil the plurality of orders.

Figure 10:
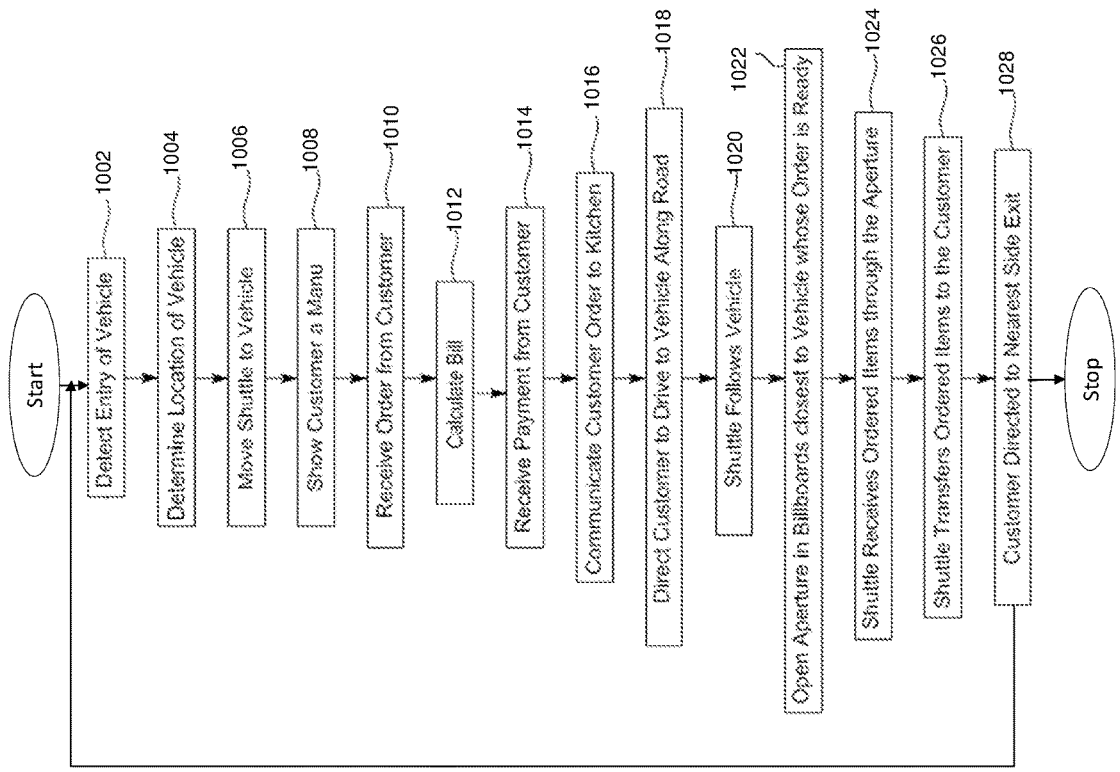
FIG. 10 is a flowchart illustrating a method of serving food orders, implemented by the interface system in the drive through facility of FIG. 9, in accordance with the second embodiment of the present disclosure.

FIG. 10 is a flowchart illustrating a method of serving food orders, implemented by the interface system 100 in the drive through facility 900, in accordance with a second embodiment of the present disclosure. The method has been explained with reference to FIGS. 1, 6 and 9.

At step 1002, the entry detector 602 detects the entry of the first vehicle 904a to the road 906. Then at step 1004, the vehicle location detector 603 determines the location of the vehicle 904a relative to the kiosk 901. Thereafter, at step 1006, the shuttle movement actuator 604 causes the first shuttle 902a along the railing system 101 to move towards the first vehicle 904a.

In an embodiment of the present disclosure, the video footage captured by a video camera system (not shown) disposed proximal to the railing system 101 is processed by the window detector 606 to detect the distance of the driver/passenger window of the first vehicle 904a from the railing system 101 and the height of the driver/passenger window from the ground. Using this location information, the arm movement actuator 608 causes the hinged arm member of the first shuttle 902a to be extended to the driver/passenger window of the vehicle 904a.

At step 1008, the customer is shown a menu of food items by extending a hinged arm member of the first shuttle 902a towards the customer. In an embodiment of the present disclosure, a visual display unit displaying the menu mounted on the hinged arm member and is operated by the user interaction unit 612 to present the customer with a menu from which they can select food items.

At step 1010, an order is received from the customer comprising their selections of food items from the menu. In an embodiment of the present disclosure, the control unit 601 receives from the user interaction unit 612 information regarding the food items selected by the customer.

At step 1012, the total bill for the order is calculated, and the total bill is presented to the customer. In an embodiment of the present disclosure, the control unit 601 retrieves from the database 616, the prices of the selected food items, and calculates the total bill for the selection. The control unit 601 then operates the user interaction unit 612 to request payment from the customer for the ordered items. The customer is requested to present their contactless payment means to the contactless payment receiver mounted on the gripping member of the first shuttle 902a.

At step 1014, payment is received from the customer by the contactless card reader or other RFID/NFC reader system. In an embodiment of the present disclosure, the payment unit 614 operates the contactless payment receiver (not shown) to receive payment of the total bill and confirm receipt of same to the control unit 601.

At step 1016, the control unit 601 communicates the customer's order to kitchen staff in the kiosk 901. In an embodiment of the present disclosure, on confirmed receipt of payment, the control unit 601 communicates the customer's order details to the kiosk 901 for preparation by kitchen staff therein.

At step 1018, the customer is directed to drive the first vehicle 904a along the road 906. In an embodiment of the present disclosure, the control unit 601 operates the user interaction unit 612 to direct the customer to drive the first vehicle 904a along the road 906.

At step 1020, the shuttle movement actuator 604 moves the first shuttle 902a along the railing system 101 to follow the first vehicle 904a as it moves along the road 906. In an embodiment of the present disclosure, the control unit 601 operates the arm movement actuator 604 to retract the second and third arm members of corresponding hinged arm member into the folded position. The control unit 601 activates the vehicle location detector 603 to update its determination of the location of the first vehicle 904a, and thereby track the movement of the first vehicle 904a as it is driven along the road 906. Using the updated location information, the shuttle movement actuator 604 causes the first shuttle 902a to be moved along the railing system 101 to follow the first vehicle 904a as it progresses along the road 906.

At step 1022, an aperture (not shown) is opened between adjacent billboards or electronic display devices mounted on the railing system 101. It may be noted that individual customer orders may differ in the number of ordered food items and/or the time required to prepare the food items. Thus, individual customer orders may take different amount of time to complete. In the event the customer order for the second vehicle 904b is completed before the second vehicle 904b reaches the receiving window 912, the billboards or electronic display devices mounted on the railing system 101 at a location proximal to the second customer vehicle 904b are slid to either side of the location to produce an aperture before the receiving window 912. The control system 108 may include an aperture location detector (not shown), in communication with the control unit 601 to determine a location of the aperture. The control unit 601 operates the arm movement actuator 608 to cause corresponding second arm member 405 to be moved into the unfolded position, and the rotatable base member 406 to be rotated so that the second arm member 405 is moved to the second rotated position to move towards the aperture.

At step 1024, the customer's order is received by the second shuttle 902b through the aperture. The control unit 601 operates the goods loading detector 610 to activate the third arm member 408 and the gripping member (not shown) to receive the customer's ordered food items by operators from behind the railing system 101 through the aperture.

At step 1026, the customer's order is transferred by the second shuttle 902b to the customer. Upon confirmation by the goods loading detector 610 of the receipt of the goods by corresponding hinged third arm member, the control unit 601 operates the arm movement actuator 608 to cause the second arm member 405 to be moved to the first rotated position and to move the second arm member 405 to a position between the folded and unfolded position as appropriate, to move the ordered food items to the driver/passenger window. In this way, food is transferred by the hinged arm member of the second shuttle 902b from the aperture to the customer.

At step 1028, the customer is directed to drive the second vehicle 904b to the nearest side exit. In an embodiment of the present disclosure, upon detection by the goods loading detector 610 of the retrieval by the customer of the food items from the third arm member 408, the control unit 601 operates the user interaction unit 612 to direct the customer to drive the second vehicle 904b to a nearest side exit or otherwise veer the second vehicle 904b away from the road 906. Thereafter, entry of next vehicle is detected, and steps 1002-1028 are repeated.

In this way, the second vehicle 904b can be peeled away from a vehicle queue as soon as the relevant customer receives their order, rather than having to wait until the customers in the vehicles ahead are served. This, in turn, frees up space for new vehicles to join the queue. Furthermore, customers whose orders take more time to be fulfilled are not negatively impacted by the early delivery of orders to customers whose orders are more quickly fulfilled. The overall effect is to increase the throughput of the drive through facility.

The drive through facility 900 of the second embodiment increases overall throughput by enabling individual customer orders to be delivered at different speeds depending on, for example, the number of items ordered; avoiding the necessity for individual customers to wait until customers ahead of them in the queue receive their orders, before they receive their own orders; and allowing customers who have received their order to leave the queue before the exit point of a conventional drive through layout, thereby freeing up space for new customers to join the queue.

Figure 11:
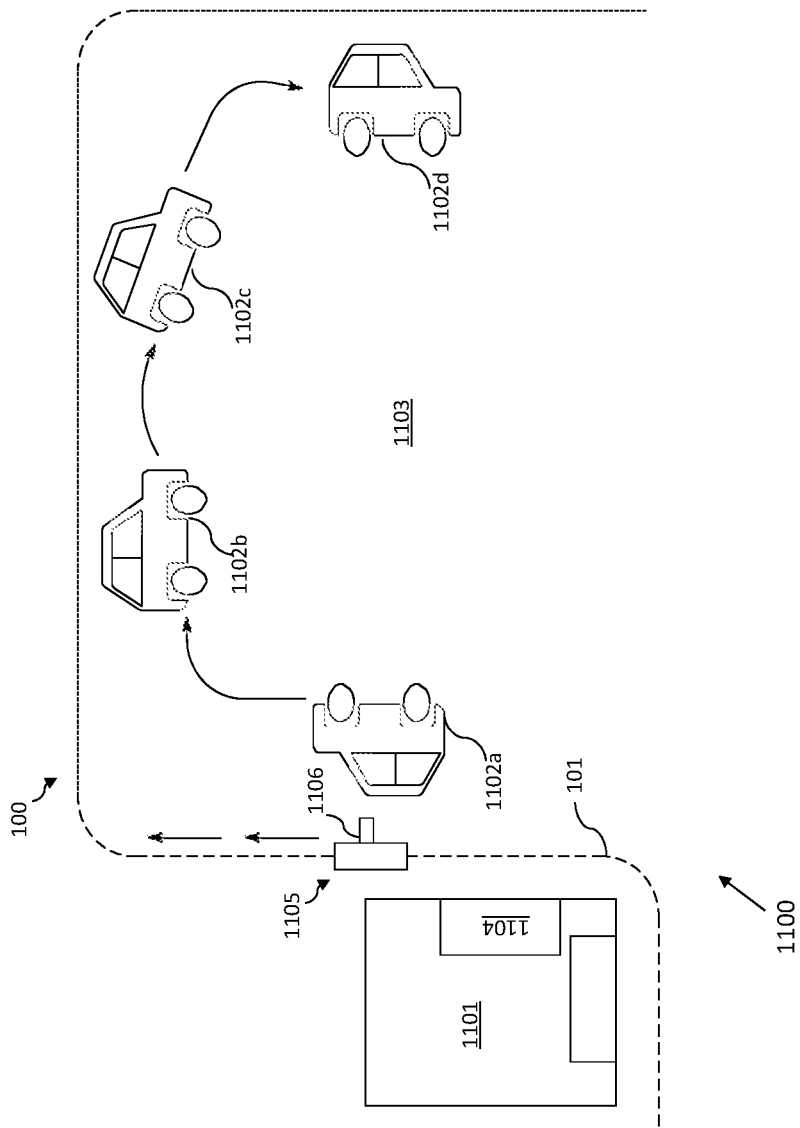
FIG. 11 is a block diagram of a drive through facility, in accordance with a third embodiment of the present disclosure.

FIG. 11 is a block diagram of a drive through facility 1100, in accordance with a third embodiment of the present disclosure. The drive through facility 1100 is one of a drive through restaurant facility and a drive through parcel center.

The drive through facility 1100 includes a kiosk 1101, and interface system 100 to serve the first through fourth vehicles 1102a-1102b in a drive through region 1103. The interface system 100 includes the railing system 101, and a shuttle 1105 including a hinged arm member 1106. In the third embodiment, individual vehicles 1102a-1102b need not congregate at the kiosk's loading area 1104 awaiting completion of their order. Instead, the vehicles 1102a-1102b may be queued in the drive through region 1103 close to the loading area 1104. Furthermore, individual vehicles 1102a-1102b can readily peel away from the queue, by driving out of the drive through region 1103, in the event an order is delivered to a given vehicle before orders are delivered to vehicles ahead of them in the queue.

Figure 12A:
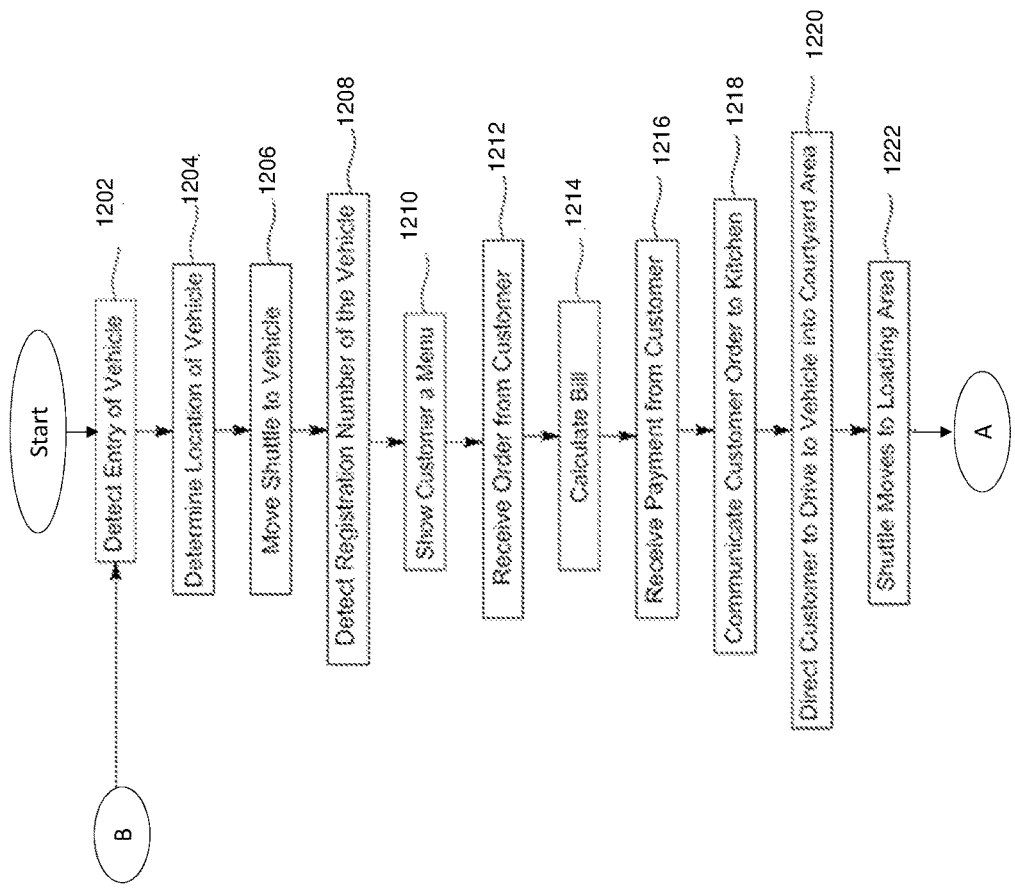
FIGS. 12A and 12B is a flowchart illustrating a method implemented by the interface system for serving food orders in the third embodiment of the drive through facility.
Figure 12B:
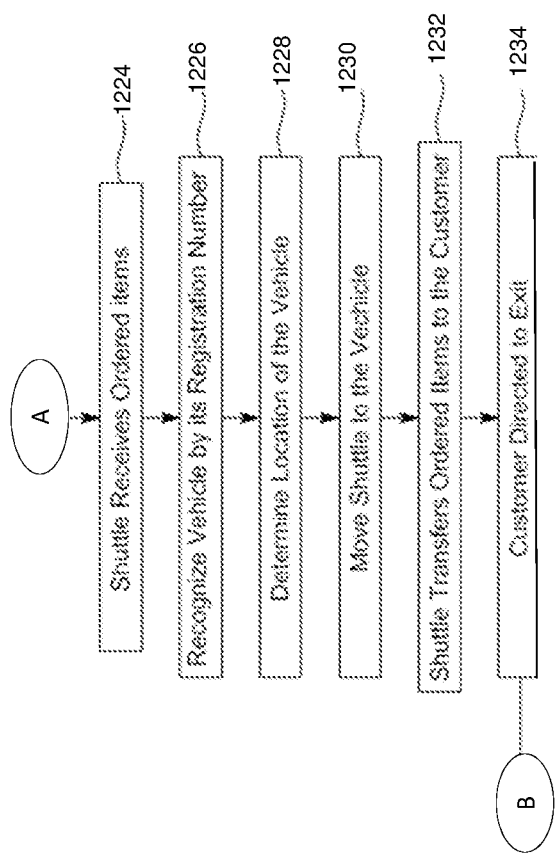

FIG. 12A and FIG. 12B are flowcharts illustrating a method implemented by the interface system 100 for serving food orders in a third embodiment of the drive through facility 1100. The method has been explained with reference to FIGS. 1, 6 and 11.

At step 1202, the entry detector 602 detects the entry of a first vehicle 1102a to drive through region 1103 of a semi-enclosed courtyard type. Then, at step 1204, the vehicle location detector 603 determines the location of the first vehicle 1102a relative to the kiosk 1101. Thereafter, at step 1206, the shuttle movement actuator 604 causes the shuttle 1105 to be moved along the railing system 101 towards the first vehicle 1102a using the location information.

At step 1208, the registration detection module may detect and recognize the registration number of the first vehicle 1102a from its number plate.

At step 1210, the customer is shown a menu of food items by extending towards the customer a hinged arm member 1106 on which a visual display unit displaying the menu is mounted on corresponding gripping member. It may be noted, that the distance of the driver/passenger window of the first vehicle 1102a from the railing system 101 and the height of the driver/passenger window from the ground (as determined in an embodiment of the present disclosure by the window detector 606 from video footage captured by a video camera system) is used to cause the second and third arm members of the hinged arm member 1106 to be extended to the driver/passenger window of the first vehicle 1102a.

At step 1212, the control unit 601 receives from the user interaction unit 612 information regarding the order of food items selected by the customer. At step 1214, the control unit 601 retrieves from the database 616 the prices of the selected food items; calculates the total bill for the selection; and presents the total bill to the customer.

At step 1216, payment is received from the customer by the contactless card reader or other RFID/NFC reader system mounted on the gripping member of the hinged arm member 1106. In an embodiment of the present disclosure the payment unit 614 operates the contactless payment receiver to receive payment of the total bill and confirm receipt of the same to the control unit 601.

At step 1218, the control unit 601 communicates the customer's order to kitchen staff in the kiosk 1101 upon confirmed receipt of payment.

At step 1220, the control unit 601 operates the user interaction unit 612 to direct the customer to drive the first vehicle 1102a into the courtyard area 1103.

At step 1222, the control unit 601 operates the shuttle movement actuator 604 to move the shuttle 1101 along the railing system 101 to the loading area 1104. On arrival of the shuttle 1101 at the loading area 1104, the control unit 601 operates the arm movement actuator 608 to cause the second arm member of the hinged arm member 1106 to be moved into the unfolded position and the rotatable base member of the hinged arm member 1106 to be rotated so that the second arm member is moved to the second rotated position. As a result, the second arm member is moved towards the loading area 1104.

At step 1224, the customer's order is received by the shuttle 1101 from the loading area 1104. In an embodiment of the present disclosure, the control unit 601 activates the goods loading detector 610 to operate the third arm member and the gripping member of the hinged arm member 1106 to receive the customer's ordered food items. Upon confirmation by the goods loading detector 610 of the receipt by the third arm member and potentially the gripping member (not shown)) of the ordered food items, the control unit 601 activates the registration detection module to process video footage captured by video cameras installed in locations proximal to the drive through region 1103, to thereby read vehicle registration number details from the number plates of the vehicle(s) in the drive through region 1103.

At step 1226, the registration detection module detects the first vehicle 1102a by comparing the registration numbers of the vehicles in the drive through region 1103 with that of the vehicle from which the order was made. On detection of the same, the registration detection module (not shown), in communication with the control unit 612, activates the vehicle location detector 603 to process the video footage of the drive through region 1103, to thereby determine the location of the first vehicle 1102a in the drive through region 1103.

At step 1228, the vehicle location detector 603 detects the location of the first vehicle 1102a. At step 1230, the shuttle movement actuator 604 uses the detected vehicle location to cause the shuttle 1105 to be moved along the railing system 101 towards the first vehicle 1102a. In an embodiment of the present disclosure, the location of the first vehicle 1102a is dynamically determined to fulfil the order by the shuttle 1105.

At step 1232, the shuttle 1105 transfers the customer's order to the customer. In an embodiment of the present disclosure, on reaching the first vehicle 1102a, the control unit 601 operates the arm movement actuator 604 to cause the second arm member of the hinged arm member 1106 to be moved to the first rotated position and to move the second arm member to a position between the folded and unfolded position as appropriate, to move the ordered food items to the driver/passenger window. In this way, food is delivered from the loading area 1104 to the customer.

At step 1234, the customer is directed to drive the first vehicle 1102a to the exit from the drive through region 1103. In an embodiment of the present disclosure, upon detection by the goods loading detector 610 of the retrieval by the customer of the food items, the control unit 601 operates the user interaction unit 612 to direct the customer to drive the first vehicle 1102a out of the drive through region 1103.

Figure 13:
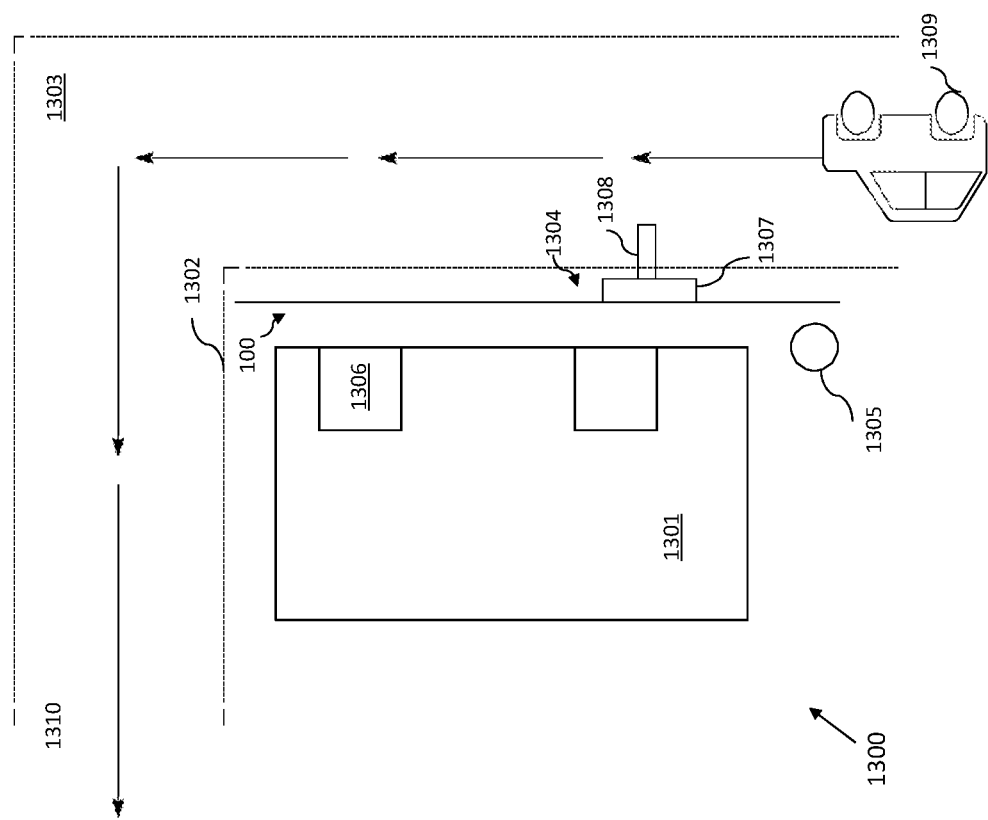
FIG. 13 is a block diagram of a drive through parcel center, in accordance with an embodiment of the present disclosure.

FIG. 13 is a block diagram of a drive through parcel center 1300 that includes a kiosk 1301 and the interface system 100 operably coupled thereto, in accordance with an embodiment of the present disclosure.

Referring to FIG. 1 and FIG. 13, the interface system 100 includes a railing system 1302 mounted on external walls of the drive through parcel center 1300. More specifically the railing system 1302 is mounted on the external walls of the kiosk 1301 that is facing a road 1303. A shuttle 1304 is movable along the railing system 1302 from a first position proximal to a speaker 1305 to a second position proximal to parcel retrieval window 1306 of the kiosk 1301. The shuttle 1304 includes a panel member 1307 and a hinged arm member 1308 facing out towards the road 1303. A control system (not shown) similar to the control system 108 is operably coupled to the shuttle 1304 for controlling the movements of the shuttle 1304, and its interactions with the customers.

The drive through facility as described with reference to FIGS. 5, 8, 9, and 11 essentially describe the usage of the interface system 100 of FIG. 1 as a one-way interface between a customer of a vehicle 1309 and a repository of food items. The one-way interface supported the withdrawal of food items from a kitchen and the delivery of these food items to a customer. However, the interface system 100 is equally capable of supporting the deposit of items into a repository. In essence, the interface system provides a bidirectional interface to a repository capable of supporting deposits to the repository, or withdrawals from the repository, or both. This aspect is particularly well exemplified by the use case of a drive through parcel center 1300 in which customers might choose to deposit parcels for storage and subsequent withdrawal by an authorised person; withdraw parcels from the parcel center; or, deposit parcels and withdraw other parcels from the parcel center.

Figure 14A:
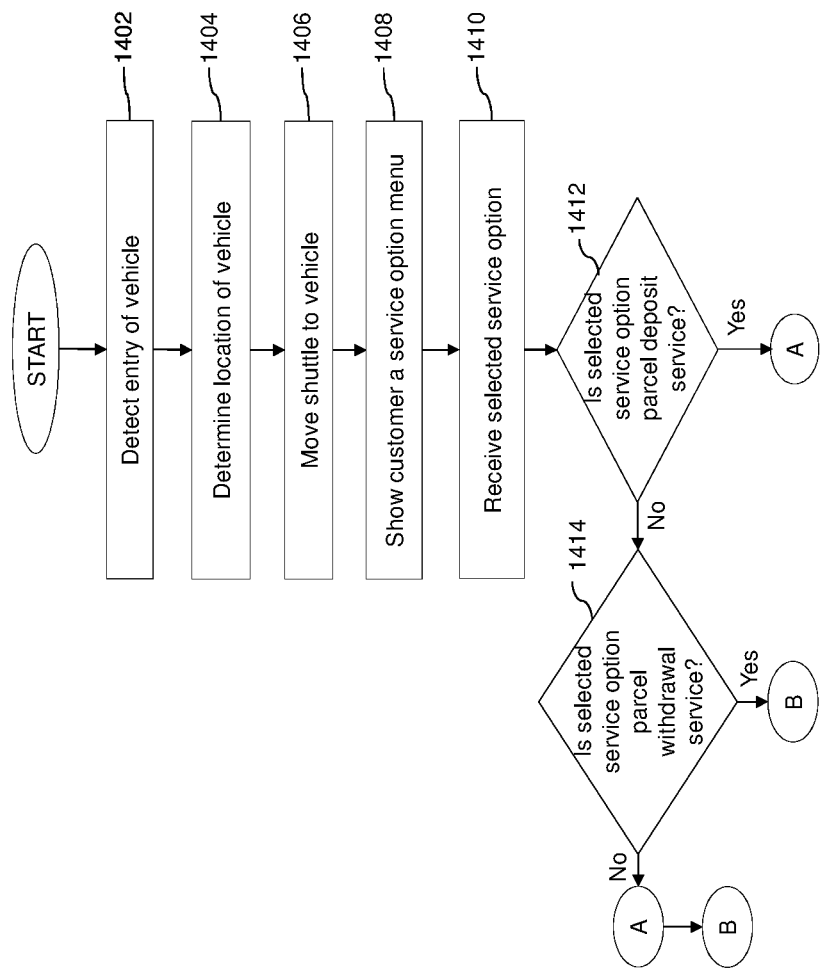
FIGS. 14A-14C is a flowchart illustrating a method implemented by the interface system in the drive through parcel center of FIG. 13.
Figure 14B:
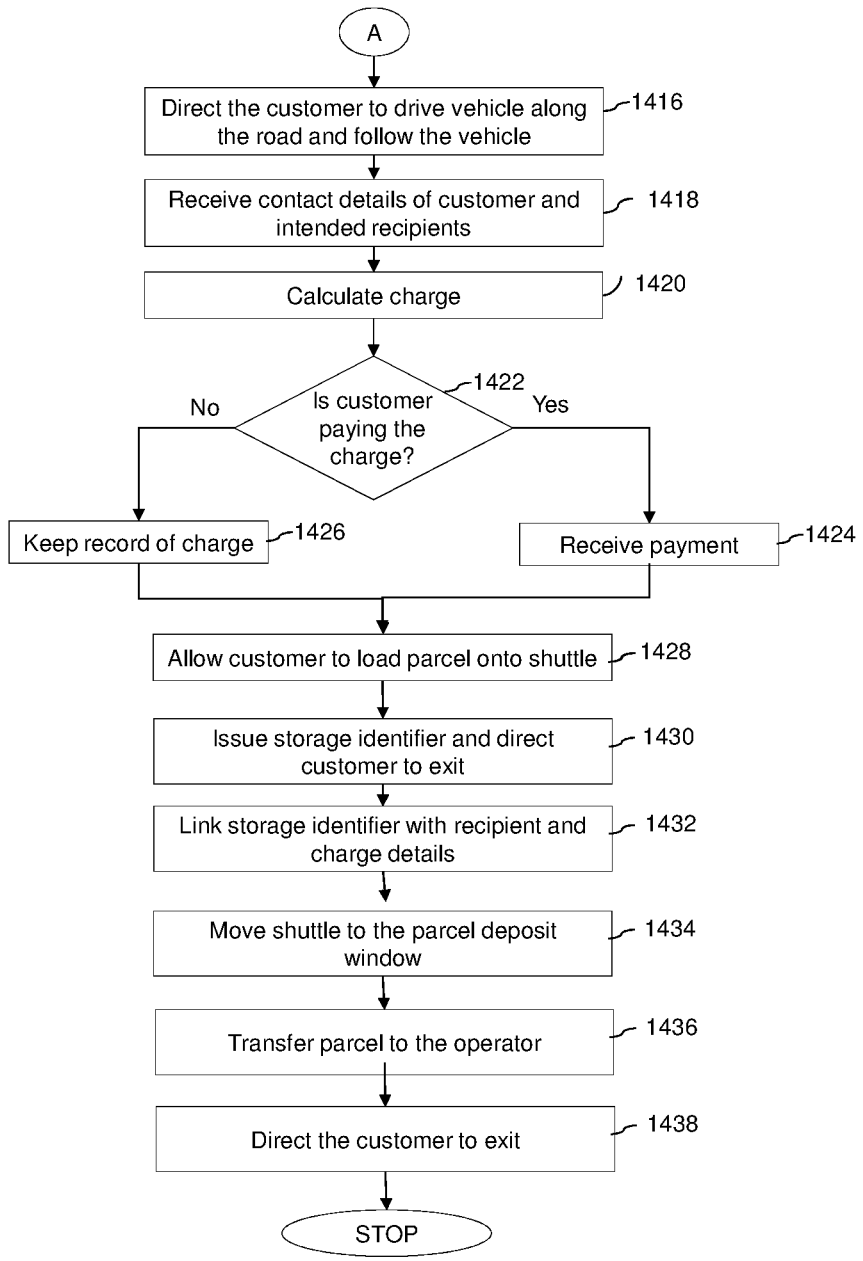

FIGS. 14A and 14B are flowcharts of a method implemented by the interface system 100 in the drive through parcel center 1300, in accordance with an embodiment of the present disclosure. The method has been explained with reference to FIGS. 1, 6 and 13.

At step 1402, the vehicle entry detector 602 detects the entry of a vehicle 1309 onto the road 1303.

At step 1404, the vehicle location detector 603 detects the location of the vehicle 1309 relative to the kiosk 1301.

At step 1406, the shuttle movement actuator 604 moves the shuttle 1304 along the railing system 1302 towards the vehicle 1309 using the vehicle location information.

At step 1408, the customer is shown a menu of service options by extending towards the customer the hinged arm member 1308 on which a visual display unit displaying the menu is mounted. The hinged arm member 1308 is operated by the arm movement actuator 608 based on distance of the driver/passenger window of the vehicle 1309 from the railing system 1302 and the height of the driver/passenger window from the ground. The menu of service options includes deposit parcels(s) or retrieve parcel(s) or both.

At step 1410, the service option selected by the customer is received. In an embodiment of the present disclosure, the control unit 612 receives from the user interaction unit 612 information regarding the service option selected by the customer.

At step 1412, it is checked if the selected service option is parcel deposit service. If the selected service option is not the parcel deposit service, then it is checked at step 1414 if the selected service option is parcel withdrawal service. At step 1416, the customer is directed to continue to drive the vehicle 1309 along the road.

If the selected service option is parcel deposit service, then in FIG. 14B, at step 1416, the shuttle 1304 directs the customer to drive vehicle along the road 1303, and follows the vehicle 1309 as it progresses along the road 1303. In an embodiment of the present disclosure, the control unit 602 activates the vehicle location detector 603 to track the movement of the vehicle 1309 as it is driven along the road 1303, and operates the user interaction unit 612 to direct the customer to continue to drive the vehicle 1309 along the road 1303 to the kiosk 1301.

At step 1418, the contact details of the customer or those of the intended recipient(s) of the parcel(s) are received from the customer. In an embodiment of the present disclosure, the control unit 601 may operate the user interaction unit 612 to request the customer to provide details such as email address, mobile phone number, and/or the duration for which the parcel(s) should be stored and/or the size of the parcel(s), and store the received details in the database 616.

At step 1420, a charge for storing the parcel(s) is calculated. In an embodiment of the present disclosure, the control unit 601 may retrieve from the database 616, the charge for storing the parcel(s).

At step 1422, it is checked if the customer is paying the charge. In an embodiment of the present disclosure, the control unit 601 may operate the user interaction unit 612 to request the customer to confirm whether the charge would be paid by the customer.

At step 1424, payment is received from the customer when the customer is paying the charge. In an embodiment of the present disclosure, the control unit 601 operates the user interaction unit 612 to request the customer to present their contactless payment means to the contactless payment reader mounted on the hinged arm member 1308.

Alternatively, if the customer is not paying the charge, at step 1426, a record of the charge is stored in the database 616 and the record is linked with the stored details of the intended recipient(s) of the parcel(s).

At step 1428, the customer is allowed to load the parcel(s) onto the shuttle 1304. In an embodiment of the present disclosure, the control unit 601 operates the user interaction unit 612 to direct the customer to load the parcel(s) to be stored in the parcel center, onto the hinged arm member 1308, and operate the goods loading detector 610 to activate the hinged arm member 1308 to receive the parcel(s) from the customer.

At step 1430, the customer is issued with a storage identifier(s) for the parcel(s) and directed to exit. In accordance with an embodiment of the present disclosure, the control unit 601 issues a storage identifier, for example, a parcel deposit number, upon confirmation by the goods loading detector 610 of receipt of the parcel(s).

At step 1432, the storage identifier(s) is linked with a record of any charges due, the contact details of the customer and details of the intended recipient(s), and is stored in the database 616. In an embodiment of the present disclosure, the control unit 601 operates the user interaction unit 612 to display the storage identifier(s) on the visual display unit. Alternatively, or additionally, the control unit 612 may use the stored customer contact details to email or send an SMS text message to the customer advising them of the storage identifier(s).

At step 1434, the shuttle 1304 is moved to the parcel deposit window 1306. In an embodiment of the present disclosure, the control unit 601 operates the shuttle movement actuator 604 to cause the shuttle 1304 to be moved along the railing system 1302 to the parcel deposit window 1306.

At step 1436, the hinged arm member 1308 transfers the parcel(s) to the operators at the parcel deposit window 1306. In an embodiment of the present disclosure, upon arrival of the shuttle 1304 at the parcel deposit window 1306, the control unit 601 operates the arm movement actuator 608 to cause the hinged arm member 1308 to move the parcel(s) to an operator at the parcel deposit window 1306. Upon detection by the goods loading detector 610 of the retrieval of the parcels by the operator, the control unit 601 operates the shuttle movement actuator 604 to cause the shuttle 1304 to be moved along the railing system 1302 towards a location of a next vehicle.

At step 1438, the customer is directed towards exit. In an embodiment of the present disclosure, the visual display unit directs the customer to drive the vehicle 1309 to the exit point 1310 or nearest side exit as appropriate.

Figure 14C:
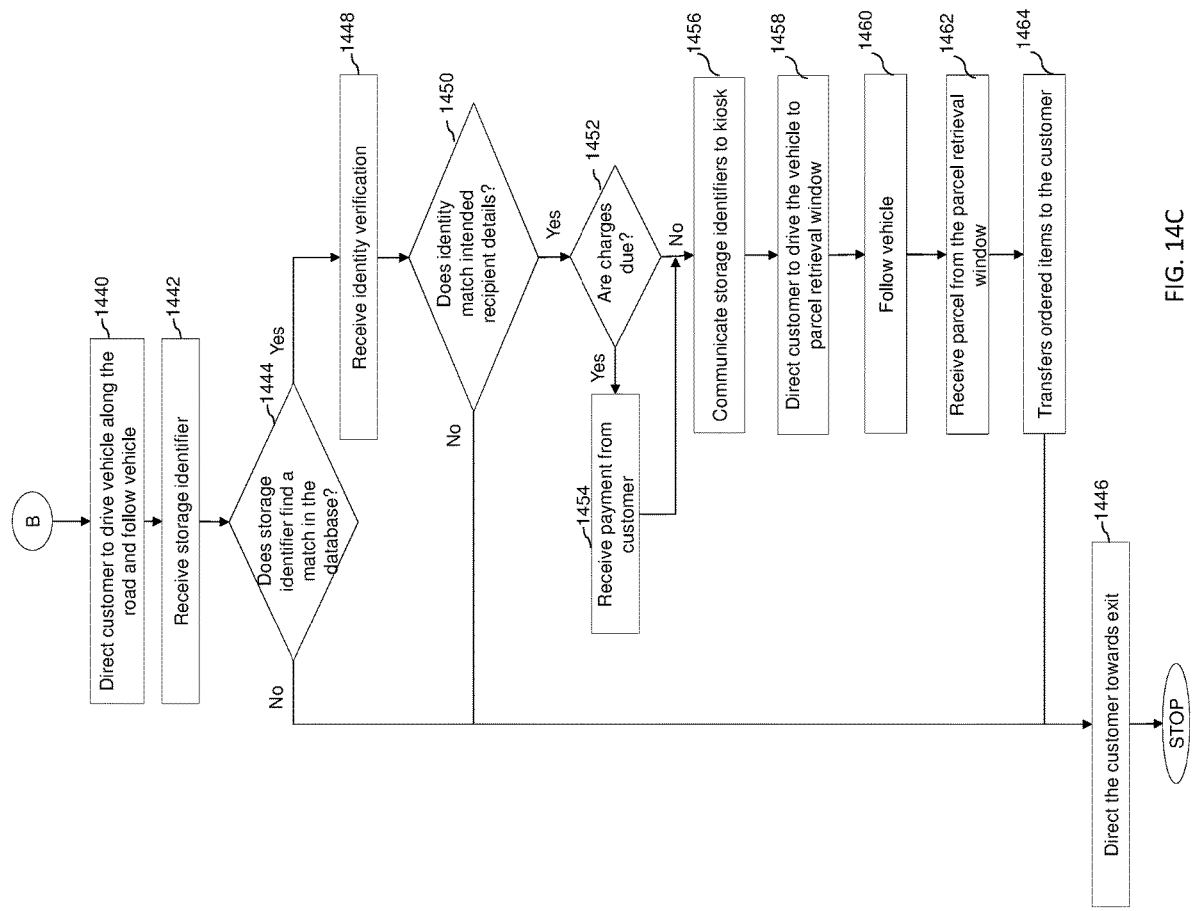

Referring back to FIG. 14A, when the selected service option is parcel withdrawal service at step 1414, then in FIG. 14C, at step 1440, the control unit 601 operates the user interaction unit 612 to direct the customer to continue driving the vehicle 1309 along the road and the shuttle movement actuator 604 moves the shuttle 1304 along the railing system 101 to follow the vehicle 1309 as the vehicle 1309 progresses along the road 1303. At step 1442, the control unit 601 operates the user interaction unit 612 to request and receive storage identifier(s) for the required parcel(s) from the customer.

At step 1444, it is checked if the storage identifier(s) received from the customer find a match in the database 616. In an embodiment of the present disclosure, the control unit 601 interrogates the database 616 to identify record(s) linked with storage identifier(s) that match the storage identifier(s) provided by the customer.

At step 1446, the customer is asked to exit in the event a match for the storage identifier is not found. In an embodiment of the present disclosure, the control unit 601 may operate the user interaction unit 612 to advise the customer of the same and to provide directions to the exit point 1310 or nearest side exit.

At step 1448, identity verification of the customer is received, if the storage identifier provided by the customer finds a match in the database 616. In an embodiment of the present disclosure, the control unit 601 may operate the user interaction unit 612 to request the customer to provide identity verification in form of a captured image of an identity document or a recorded utterance of the customer.

At step 1450, it is checked if the identity details provided by the customer match with the intended recipient details. In accordance with an embodiment of the present disclosure, the control unit 601 may retrieve from the database 616, details of the intended recipient(s) of the matching parcel(s), and compare features from the received identity verification with the stored details of the intended recipient(s) of the matching parcel(s). The control unit 601 may employ pattern recognition algorithms, for example, deep convolutional networks to compare the extracted features from the identity verification provided by the customer with the retrieved details of the intended recipient(s) of the matching parcel(s).

If the provided identity details do not match with the intended recipient details, step 1446 is performed. Alternatively, at step 1452, it is determined if there are charges associated with the storage of the matching parcel(s). In an embodiment of the present disclosure, the control unit 601 may retrieve from the matching record, details of any outstanding charges associated therewith. Alternatively, or additionally, the control unit 601 may calculate or re-calculate the charges.

At step 1454, payment is received from the customer in the event charges are determined to be due for the matching parcel(s). In an embodiment of the present disclosure, the control unit 601 operates the user interaction unit 612 to request payment from the customer for the charges. The customer is requested to present their contactless payment means to the contactless payment reader mounted on the hinged arm member 1308.

At step 1456, the storage identifier(s) of the matching parcel(s) details are communicated to the kiosk 1301 by the control unit 601, for retrieval of the parcel(s) by the operators upon confirmed receipt of payment.

At step 1458, the customer is directed to drive the vehicle 1309 along the road 1303 to the kiosk's parcel retrieval window 1306. In an embodiment of the present disclosure, the control unit 601 operates the user interaction unit 612 to direct the customer to drive the vehicle 1309 along the road 1303 to the kiosk's parcel retrieval window 1306.

At step 1460, the shuttle 1304 follows the vehicle 1309 as it drives to the kiosk's parcel retrieval window 1306.

At step 1462, the control unit 601 operates the hinged arm member 1308 to retrieve the matching parcel(s) from the operators (not shown) at the parcel retrieval window 1306. In an embodiment of the present disclosure, upon arrival of the vehicle 1309 at the kiosk's parcel retrieval window 1306, the control unit 601 operates the arm movement actuator 608 to cause the hinged arm member 1308 to move towards the kiosk's parcel retrieval window 1306.

At step 1464, the control unit 601 operates the hinged arm member 1308 to transfer the matching parcel(s) to the customer. In an embodiment of the present disclosure, the control unit 601 operates the goods loading detector 610 to operate the hinged arm member 1308 to receive the matching parcel(s) by operators from behind the railing system 1302. Thereafter, the hinged arm member 1308 is operated to move the matching parcel(s) to the driver/passenger window. In this way, the matching parcel(s) are transferred by the hinged arm member 1308 from the kiosk's parcel retrieval window 1306 to the customer.

Upon detection of the retrieval of the matching parcel(s) by the customer from the hinged arm member 1308, the control unit 601 performs step 1446 to operate the user interaction unit 612 to direct the customer to drive the vehicle 1309 to the exit 1310. The control unit 601 further operates the shuttle 1304 to be moved along the railing system 1302 towards the location of the next vehicle.

When the user does not select the parcel withdrawal service at step 1414, then it means that the user has selected a service option of depositing and withdrawing a parcel from the drive through parcel center 1300. In that, the customer deposits a first parcel into the parcel center, and withdraws a second parcel from the parcel center. For depositing the first parcel in the parcel center, steps 1416-1436 are executed for depositing the first parcel in the kiosk 1306, and at step 1438, instead of directing the customer to drive the vehicle 1309 to the exit point 1310, or nearest side exit, the user is directed to continue driving the vehicle 1309 along the road 1303, and steps 1440-1464 are executed.

Figure 15:
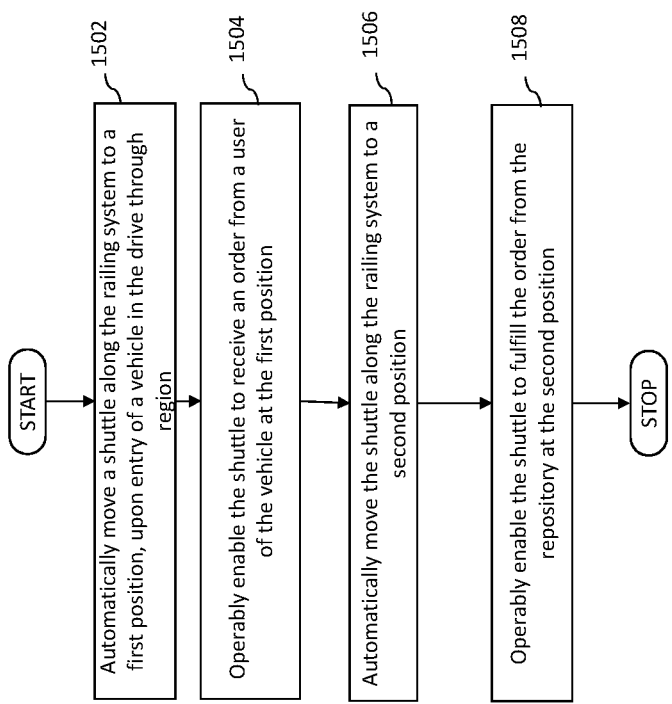
FIG. 15 is a flowchart illustrating a method of serving one or more vehicles in a drive through facility of FIG. 5.

FIG. 15 is a flowchart illustrating a method of serving one or more vehicles in a drive through facility of FIGS. 1 and 5.

At step 1502, the control system 108 automatically moves a shuttle 104 along the railing system 101 to a first position, upon entry of a vehicle 508 in the drive through region.

At step 1504, the control system 108 operably enable the shuttle 104 to receive an order from a user of the vehicle 508 at the first position.

At step 1506, the control system 108 automatically moves the shuttle 104 along the railing system 101 to a second position.

At step 1508, the control system 108 operably enables the shuttle 104 to fulfill the order from the repository 105 at the second position.

It would be apparent to one of ordinary skill in the art that the broad framework for the operations of the interface system in a drive through parcel center is operable within the queued vehicle arrangement in a courtyard area. Similarly, the broad framework for the operations of the interface system in a drive through parcel center is operable with an arcuate railing system with slidable billboards mounted thereon to facilitate access to the customer through an aperture between adjacent billboards.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A shuttle movable along a railing system extending alongside a repository, comprising:
    a panel member having a first face proximal to the railing system, and a second face distal therefrom; and
    a hinged arm member rotatable about a center of the second face of the panel member, and having first and second ends, wherein the hinged arm member is configured to move the second end between an unfolded position in which the second end is distal from the panel member, and a folded position, in which the second end is proximal to the second face of the panel member, and wherein the hinged arm member has a height and reach automatically adjustable to reach a user.

2. The shuttle of claim 1 further comprising:
    a rotatable base member disposed on, and coupled to, the center of the second face of the panel member for angularly rotating in a range of about 0-180 degrees about a center of the second face of the panel member; and
    the hinged arm member comprising:
        a first arm member having a first end supported by the rotatable base member and a second end disposed away from the first end;
        a second arm member having a first end pivotally coupled to the second end of the first arm member, and a second end disposed away from the first end of the second arm member, wherein a length of the second arm member is greater than half a width of the panel member;
        a third arm member pivotally coupled to the second end of the second arm member; and
        a gripping member supported by the third arm member and operable to permit opening and gripping to receive and hold a goods item and further opening to permit release of the goods item.

3. The shuttle of claim 2, wherein the adjusting the height and reach of the hinged arm member comprises moving the second arm member from the unfolded position in which the second arm member extends from the first arm member substantially at a right angle to the first arm member, to the folded position in which the second arm member is disposed proximal to the first arm member and substantially in parallel therewith.

4. The shuttle of claim 3, wherein when the second arm member is in the unfolded position, rotation of the rotatable base member causes the second arm member to be moved from a first rotated position orthogonally disposed to a direction of movement of the panel member to a second rotated position co-axially aligned with the direction of movement of the panel member.

5. The shuttle of claim 3 further comprising at least a pair of wheeled members coupled to the first face of the panel member, for facilitating sliding engagement of the panel member with the railing system.

6. The shuttle of claim 2 further comprising a motor system configured to:
    operatively drive the panel member along the railing system;
    operatively rotate the rotatable base member about the center of the second face of the panel member;
    operatively pivot the second arm with respect to the first arm; and
    operatively move the gripping member.

7. The shuttle of claim 6, wherein the motor system is operably driven by a control system to:
    slide the panel member along the railing system to a first position;
    enable the hinged arm member to automatically reach a window of a vehicle at the first position to receive an order from a user in the vehicle;
    slide the panel member along the railing system to a second position;
    enable the gripping member to receive and hold a goods item pertaining to the received order, from the repository at the second position; and
    enable the hinged arm member to automatically reach the window of the vehicle and enable the gripping member to release the goods item to the user.

8. The shuttle of claim 6, wherein the motor system is operably driven by a control system to:
    slide the panel member along the railing system to a first position;
    enable the hinged arm member to automatically reach the window of the vehicle at the first position to receive an order from a user in the vehicle;
    enable the hinged arm member to automatically reach the window of the vehicle and enable the gripping member to receive and hold a goods item pertaining to the received order from the user;
    slide the panel member along the railing system to a second position; and
    enable the gripping member to release the goods item into the repository at the second position.

9. The shuttle of claim 1, wherein the railing system extends in at least one of: a linear manner and a curvilineal manner alongside the repository.

10. The shuttle of claim 1, wherein the railing system includes a monorail.

11. An interface system for a repository, comprising:
    a railing system extending alongside the repository; and
    a shuttle system comprising a plurality of shuttles, each shuttle movable along the railing system, and comprising:
        a panel member having a first face proximal to the railing system, and a second face distal therefrom; and
        a hinged arm member rotatable about a center of the second face of the panel member, and having first and second ends, wherein the hinged arm member is configured to move the second end between an unfolded position in which the second end is distal from the panel member, and a folded position, in which the second end is proximal to the second face of the panel member, and wherein the hinged arm member has a height and reach automatically adjustable to reach a user.

12. The interface system of claim 11, wherein each shuttle further comprises:
    a rotatable base member disposed on, and coupled to, the center of the second face of the panel member for angularly rotating in a range of about 0-180 degrees about a center of the second face of the panel member; and
    the hinged arm member comprising:
        a first arm member having a first end supported by the rotatable base member and a second end disposed away from the first end;
        a second arm member having a first end pivotally coupled to the second end of the first arm member, and a second end disposed away from the first end of the second arm member, wherein a length of the second arm member is greater than half a width of the panel member;
a third arm member pivotally coupled to the second end of the second arm member; and
a gripping member supported by the third arm member and operable to permit opening and gripping to receive and hold a goods item and further opening to permit release of the goods item.

13. The interface system of claim 11, wherein the railing system comprises:
an upper rail member;
a lower rail member positioned in a co-planar and spaced-apart relationship to the upper rail member, the lower rail member being coterminous in length with the upper rail member; and
a plurality of support structures for connecting the upper and lower rail members, such that each support structure from the plurality of support structures is spaced apart from a successive one of the support structures in an equidistant manner along the length of the upper and lower rail members.

14. The interface system of claim 13, wherein each support structure comprises:
a clamping member arranged to engage with a pair of opposite faces of the upper and lower rail members;
a foot member coupled to the clamping member and disposed proximal to the lower rail member, the foot member extending perpendicularly away from the clamping member; and
a strut member positioned in angular relation with each of the co-planar upper and lower rail members, the strut member extending between, and connected to, a pair of distally located portions of the clamping member and the foot member respectively.

15. The interface system of claim 11, wherein the railing system comprises:
the upper rail member includes a first upper rail member and a second upper rail member,
the lower rail member includes a first lower rail member and a second lower rail member, and wherein each support structure comprises:
an upright member having:
a first end provided with a bipedal base structure, wherein the bipedal base structure has a first foot and a second foot spaced apart by a horizontal spacing member, the horizontal spacing member being arranged to support the second lower rail member; and
a second end coupled with a horizontal grip member for securing to the first upper rail member; and
a base plate configured to support the first and second feet of the bipedal base structure thereon.

16. The interface system of claim 11, wherein the railing system is configured to support at least one of: billboards or electronic display devices for visually displaying information pertaining to advertisements and promotions, wherein the railing system is further configured to define an aperture between a pair of adjacently located billboards and electronic display devices.

17. The interface system of claim 16, wherein each shuttle comprises a motor system coupled thereto, to
operatively drive corresponding panel member along the railing system;
operatively rotate corresponding rotatable base member about the center of the second face of the panel member;
operatively pivot corresponding second arm with respect to the first arm; and
operatively move corresponding gripping member.

18. The interface system of claim 17 further comprising:
a control system operably coupled to each motor system of each shuttle, and configured to:
detect entry of a vehicle into a drive through facility, when the repository is in the drive through facility;
detect a location of the vehicle within the drive through facility;
identify a shuttle to serve the vehicle;
actuate a motor system of the identified shuttle to move corresponding shuttle along the railing system in response to the detected location of the vehicle;
determine a position of a window of the vehicle relative to the railing system;
actuate the motor system to enable gripping member of the identified shuttle to hold a user display device;
actuate the motor system to move the hinged arm member towards the window of the vehicle to enable the user display device to interact with the user to receive an order;
actuate the motor system to slide the panel member along the railing system to a second position upon receiving the order;
actuate the motor system to enable the gripping member to receive a goods item from the repository at the second position corresponding to the order; and
actuate the motor system to enable the hinged arm member to automatically reach the window of the vehicle and enable the gripping member to release the goods item to the user.

19. The interface system of claim 18, wherein the control system is further configured to:
provide one or more user interfaces on the user display device to receive the order, and enable payment of the order; and
store data pertaining to identity, historical and current transactions of one or more users.

20. The interface system of claim 18, wherein the control system is further configured to detect a location of the vehicle by detecting a registration number of the vehicle.

21. The interface system of claim 18, wherein the control system is further configured to to detect a location of the aperture in the railing system, and actuate movement of a shuttle towards the aperture.

22. A method of serving a user from a repository, by a shuttle including a panel member having a first face proximal to a railing system, and a hinged arm member rotatable about a center of a second face of the panel member and attached thereto, comprising:
automatically sliding the panel member along the railing system to a first position;
enabling the hinged arm member to automatically reach the user to receive an order from the user at the first position;
automatically sliding the panel member along the railing system to a second position;
enabling the hinged arm member to receive a goods item pertaining to the order from the repository; and
enabling the hinged arm member to automatically reach the user to provide the goods item to the user.

* * * * *